(12) United States Patent
Iwata et al.

(10) Patent No.: US 11,374,787 B2
(45) Date of Patent: Jun. 28, 2022

(54) SWITCH DEVICE, COMMUNICATION CONTROL METHOD, AND COMMUNICATION CONTROL PROGRAM

(71) Applicants: Sumitomo Electric Industries, Ltd., Osaka (JP); AutoNetworks Technologies, Ltd., Yokkaichi (JP); Sumitomo Wiring Systems, Ltd., Yokkaichi (JP); Toyota Jidosha Kabushiki Kaisha, Toyota (JP)

(72) Inventors: Akihito Iwata, Osaka (JP); Hideyuki Tanaka, Osaka (JP); Hideki Maeda, Osaka (JP); Tatsuya Izumi, Osaka (JP); Takeshi Hagihara, Yokkaichi (JP); Yasuhiro Yabuuchi, Yokkaichi (JP); Yasuhiro Yamasaki, Toyota (JP); Hiroya Ando, Toyota (JP); Toshio Kawamura, Toyota (JP); Hirofumi Urayama, Toyota (JP)

(73) Assignees: Sumitomo Electric Industries, Ltd., Osaka (JP); AutoNetwork Technologies, Ltd., Yokkaichi (JP); Sumitomo Wiring Systems, Ltd., Yokkaichi (JP); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 17/283,431

(22) PCT Filed: Aug. 1, 2019

(86) PCT No.: PCT/JP2019/030217
§ 371 (c)(1),
(2) Date: Apr. 7, 2021

(87) PCT Pub. No.: WO2020/095490
PCT Pub. Date: May 14, 2020

(65) Prior Publication Data
US 2021/0344522 A1 Nov. 4, 2021

(30) Foreign Application Priority Data
Nov. 5, 2018 (JP) ............................ JP2018-208356

(51) Int. Cl.
*H04L 12/40* (2006.01)
(52) U.S. Cl.
CPC .. *H04L 12/40136* (2013.01); *H04L 12/40065* (2013.01); *H04L 12/40176* (2013.01); *H04L 2012/40273* (2013.01)
(58) Field of Classification Search
CPC ......... H04L 12/40136; H04L 12/40065; H04L 12/40176; H04L 2012/40273
See application file for complete search history.

(56) References Cited

U.S. PATENT DOCUMENTS

2007/0025250 A1* 2/2007 Shimonishi ............. H04L 69/16
370/231
2010/0054270 A1* 3/2010 Shinozaki ............... H04L 47/12
370/413

(Continued)

FOREIGN PATENT DOCUMENTS

JP 2010-213098 A 9/2010
JP 2013-168865 A 8/2013

(Continued)

*Primary Examiner* — Luat Phung
(74) *Attorney, Agent, or Firm* — Baker Botts L.L.P.; Michael A. Sartori

(57) ABSTRACT

A switch device installed in a vehicle is provided with: a switch unit configured to relay communication data between a plurality of function units installed in the vehicle; a storage unit configured to hold the communication data to be relayed; and a control unit configured to determine a state of the storage unit, and adjust, for each of applications, a throughput of the communication data to be transmitted from the function units, based on a result of the determination.

5 Claims, 17 Drawing Sheets

(56) References Cited

U.S. PATENT DOCUMENTS

| | | | |
|---|---|---|---|
| 2011/0208884 A1* | 8/2011 | Horihata | H04L 12/40143 710/105 |
| 2013/0311643 A1* | 11/2013 | Kulkarni | H04L 47/283 709/224 |
| 2016/0173530 A1 | 6/2016 | Miyake | |
| 2018/0126930 A1 | 5/2018 | Ando et al. | |
| 2019/0356608 A1* | 11/2019 | Tanaka | H04L 49/25 |
| 2020/0091991 A1* | 3/2020 | Fujishiro | H04B 7/15507 |
| 2020/0305165 A1* | 9/2020 | Inokuchi | H04W 28/14 |

FOREIGN PATENT DOCUMENTS

| | | |
|---|---|---|
| JP | 2018-070121 A | 5/2018 |
| WO | 2008/142774 A1 | 11/2008 |
| WO | 2011/074116 A1 | 6/2011 |
| WO | 2018/109976 A1 | 6/2018 |

\* cited by examiner

FIG. 2

| DEVICE | VID | MAC ADDRESS | IP ADDRESS |
|---|---|---|---|
| ON-VEHICLE DEVICE A | 1 | MAC-A | IP-A |
| ON-VEHICLE DEVICE B | 1 | MAC-B | IP-B |
| ON-VEHICLE DEVICE C | 1 | MAC-C | IP-C |
| ON-VEHICLE DEVICE D | 2 | MAC-D | IP-D |
| ON-VEHICLE DEVICE E | 2 | MAC-E | IP-E |
| SWITCH DEVICE | 1,2 | MAC-G | IP-G |

FIG. 9

| USAGE AMOUNT OF STORAGE UNIT (kbyte) | RELAY DELAY TIME (msec) | |
|---|---|---|
| | APPLICATION 1 | APPLICATION 2 |
| 1000 | 10 | 20 |
| 1500 | 15 | 30 |
| 2000 | 20 | 40 |
| 2500 | 25 | 50 |
| ⋮ | ⋮ | ⋮ |

FIG. 12

| USAGE AMOUNT OF STORAGE UNIT (kbyte) | REDUCTION AMOUNT OF WINDOW SIZE(byte) ||
|---|---|---|
| | APPLICATION 1 | APPLICATION 2 |
| 1000 | 1000 | 2000 |
| 1500 | 1500 | 3000 |
| 2000 | 2000 | 4000 |
| 2500 | 2500 | 5000 |
| ... | ... | ... |

FIG. 15

| TRANSMISSION RATE (Mbps) | USAGE AMOUNT OF STORAGE UNIT (kbyte) |
|---|---|
| 50 | 500 |
| 75 | 1000 |
| 100 | 1500 |
| 125 | 2000 |
| 150 | 2500 |
| ⋮ | ⋮ |

US 11,374,787 B2

SWITCH DEVICE, COMMUNICATION CONTROL METHOD, AND COMMUNICATION CONTROL PROGRAM

TECHNICAL FIELD

The present invention relates to a switch device, a communication control method, and a communication control program.

This application claims priority on Japanese Patent Application No. 2018-208356 filed on Nov. 5, 2018, the entire content of which is incorporated herein by reference.

BACKGROUND ART

PATENT LITERATURE 1 (Japanese Laid-Open Patent Publication No. 2013-168865) discloses an on-vehicle network system as follows. That is, the on-vehicle network system includes: an on-vehicle control device having a memory that stores therein definition data defining a part, of a communication protocol used in an on-vehicle network, which depends on implementation on the on-vehicle network; and a communication protocol issuing device that issues the definition data to the on-vehicle control device. When the communication protocol issuing device receives, from a registration device that allows the on-vehicle control device to participate in the on-vehicle network, a registration request that requests participation of the on-vehicle control device in the on-vehicle network, the communication protocol issuing device performs authentication for the registration device, creates the definition data based on implementation on the on-vehicle network, and returns the definition data to the registration device. The registration device receives the definition data transmitted from the communication protocol issuing device, and requests the on-vehicle control device to store the received definition data in the memory. Then, the on-vehicle control device receives the definition data from the registration device, stores the definition data in the memory, and performs communication by using the on-vehicle network, based on the part, of the communication protocol, defined by the definition data.

CITATION LIST

Patent Literature

PATENT LITERATURE 1: Japanese Laid-Open Patent Publication No. 2013-168865

SUMMARY OF INVENTION (1) A switch device according to the present disclosure is a switch device installed in a vehicle, and including: a switch unit configured to relay communication data between a plurality of function units installed in the vehicle; a storage unit configured to hold the communication data to be relayed; and a control unit configured to determine a state of the storage unit, and adjust, for each of applications, a throughput of the communication data to be transmitted from the function units, based on a result of the determination.

(6) A communication control method according to the present disclosure is a method for a switch device that is installed in a vehicle and includes a storage unit for holding communication data to be relayed. The method includes: relaying communication data between a plurality of function units installed in the vehicle; and determining a state of the storage unit, and adjusting, for each of applications, a throughput of the communication data to be transmitted from the function units, based on a result of the determination.

(7) A communication control program according to the present disclosure is a communication control program for a switch device that is installed in a vehicle and includes a storage unit for holding communication data to be relayed. The program causes a computer to function as: a switch unit configured to relay communication data between a plurality of function units installed in the vehicle; and a control unit configured to determine a state of the storage unit, and adjust, for each of applications, a throughput of the communication data to be transmitted from the function units, based on a result of the determination.

One mode of the present disclosure can be realized not only as a switch device including such a characteristic processing unit but also as an on-vehicle communication system including the switch device. One mode of the present disclosure can be realized as a semiconductor integrated circuit that realizes a part or the entirety of the switch device.

BRIEF DESCRIPTION OF DRAWINGS

FIG. 2 shows an example of VID, MAC address, and IP address of each device in the on-vehicle communication system according to the embodiment of the present disclosure.

FIG. 9 shows an example of a delay time table held by a control unit in the switch device according to the embodiment of the present disclosure.

FIG. 12 shows an example of a window size table held by the control unit in the switch device according to the embodiment of the present disclosure.

FIG. 15 shows an example of a usage amount estimation table held by the control unit in the switch device according to the embodiment of the present disclosure.

DESCRIPTION OF EMBODIMENTS

Figure 1:
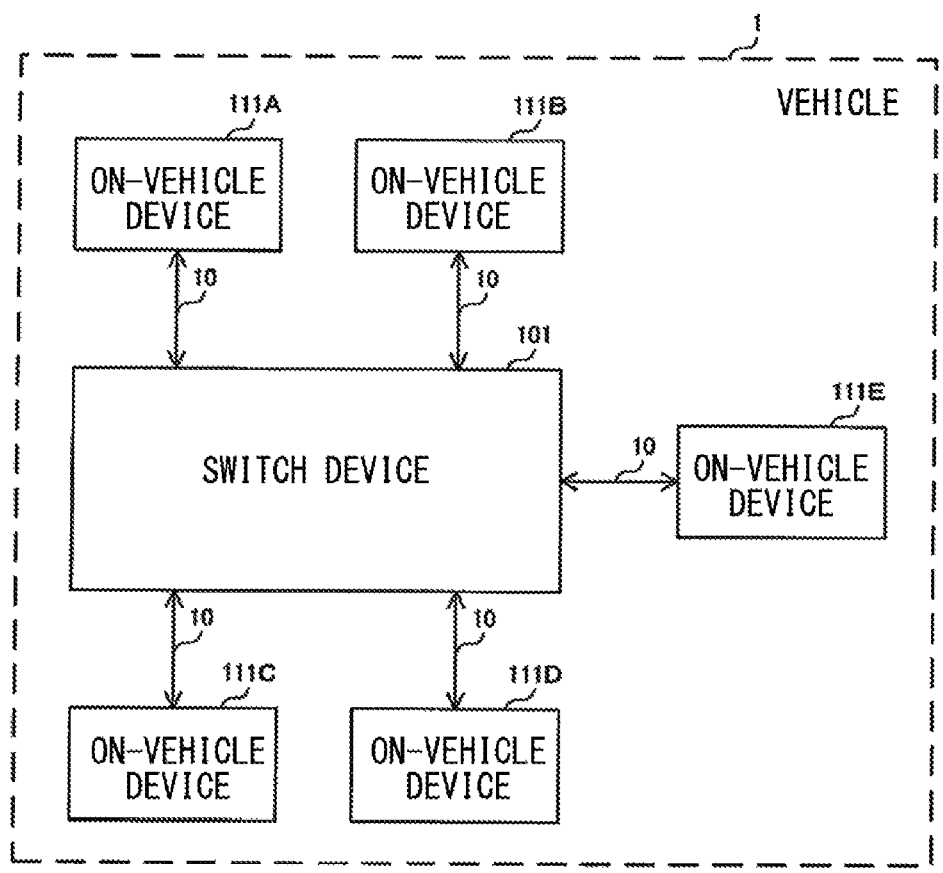
FIG. 1 shows a configuration of an on-vehicle communication system according to an embodiment of the present disclosure.

To date, on-vehicle network systems for improving security in on-vehicle networks have been developed.

Problems to be Solved by the Present Disclosure

In the on-vehicle network described in PATENT LITERATURE 1, a communication gateway that relays communication data transmitted/received between on-vehicle ECUs (Electronic Control Units) is provided.

For example, a large amount of communication data received from the on-vehicle ECUs may sometimes cause the communication gateway to be in a congestion state.

The present disclosure is made to solve the above problem and an object of the present disclosure is to provide a switch device, a communication control method, and a communication control program capable of realizing a more stable communication environment in an on-vehicle network.

Effects of the Present Disclosure

According to the present disclosure, a more stable communication environment can be realized in an on-vehicle network.

Description of Embodiment of the Present Disclosure

First, contents of embodiments of the present disclosure are listed and described.

(1) A switch device according to an embodiment of the present disclosure is a switch device installed in a vehicle, and including: a switch unit configured to relay communication data between a plurality of function units installed in the vehicle; a storage unit configured to hold the communication data to be relayed; and a control unit configured to determine a state of the storage unit, and adjust, for each of applications, a throughput of the communication data to be transmitted from the function units, based on a result of the determination.

With this configuration, the throughput of the communication data transmitted from the function unit can be adjusted for each application, according to the state of the storage unit. For example, when the switch device is in the congestion state, transmission of the communication data can be selectively restricted according to the priority levels of the applications. Thus, the congestion state of the switch device can be eased without a significant reduction in the throughput of the communication data regarding an application having a higher priority level, whereby retention of the communication data in the switch device and transmission delay of the communication data can be adjusted in a well-balanced manner. Therefore, a more stable communication environment can be realized in the on-vehicle network.

(2) Preferably, each function unit transmits the communication data upon receiving an ACK from another function unit, and the control unit adjusts the throughput by causing the switch unit to delay relay of the ACK.

With this configuration, since the control unit delays relay of the ACK, the transmission timing of next communication data from the function unit can be delayed. Thus, it is possible to adjust the throughput for each application while using the existing process.

(3) Preferably, each function unit transmits the communication data, per unit time, of an amount corresponding to transmission size information received from another function unit, and the control unit changes a content of the transmission size information received by the switch unit and causes the switch unit to relay the transmission size information, thereby adjusting the throughput.

With this configuration, since the control unit changes the content of the transmission size information and causes the switch unit to relay the transmission size information, the amount of communication data to be transmitted next from the function unit can be adjusted. Thus, it is possible to adjust the throughput for each application while using the existing process.

(4) Preferably, the switch device further includes a plurality of communication ports. The switch unit transmits and receives the communication data via the communication ports, and the control unit determines the state, based on a transmission rate of the communication data at the communication ports.

With this configuration, the state of the storage unit can be estimated in advance based on the transmission rate at the communication port, and the state of the storage unit can be determined based on the estimation result. Therefore, for example, before the capacity of the storage unit actually runs short, the throughput of communication data to be transmitted from the function unit can be adjusted for each application.

(5) Preferably, the control unit compares the ACK that is received this time from a function unit with the ACK that has been received last time from the same function unit, and determines whether or not to delay relay of the ACK that is received this time, based on a result of the comparison.

For example, if a function unit cannot normally receive communication data transmitted from another function unit, this function unit may consecutively transmit, a plurality number of times, an ACK to the other function unit in order to request retransmission of the communication data from the other function unit. In this case, the above configuration can prevent retransmission of the communication data from being delayed.

(6) A communication control method according to an embodiment of the present disclosure is a method for a switch device that is installed in a vehicle and includes a storage unit for holding communication data to be relayed. The method includes: relaying communication data between a plurality of function units installed in the vehicle; and determining a state of the storage unit, and adjusting, for each of applications, a throughput of the communication data to be transmitted from the function units, based on a result of the determination.

With this configuration, the throughput of the communication data transmitted from the function unit can be adjusted for each application, according to the state of the storage unit. For example, when the switch device is in the congestion state, transmission of the communication data can be selectively restricted according to the priority levels of the applications. Thus, the congestion state of the switch device can be eased without a significant reduction in the throughput of the communication data regarding an application having a higher priority level, whereby retention of the communication data in the switch device and transmission delay of the communication data can be adjusted in a well-balanced manner. Therefore, a more stable communication environment can be realized in the on-vehicle network.

(7) A communication control program according to an embodiment of the present disclosure is a communication control program for a switch device that is installed in a vehicle and includes a storage unit for holding communication data to be relayed. The program causes a computer to function as: a switch unit configured to relay communication data between a plurality of function units installed in the vehicle; and a control unit configured to determine a state of the storage unit, and adjust, for each of applications, a throughput of the communication data to be transmitted from the function units, based on a result of the determination.

With this configuration, the throughput of the communication data transmitted from the function unit can be adjusted for each application, according to the state of the storage unit. For example, when the switch device is in the congestion state, transmission of the communication data can be selectively restricted according to the priority levels of the applications. Thus, the congestion state of the switch device can be eased without a significant reduction in the throughput of the communication data regarding an application having a higher priority level, whereby retention of the communication data in the switch device and transmission delay of the communication data can be adjusted in a well-balanced manner. Therefore, a more stable communication environment can be realized in the on-vehicle network.

Hereinafter, an embodiment of the present disclosure will be described with reference to the drawings. In the drawings, the same or corresponding parts are denoted by the same reference signs, and the descriptions thereof are not repeated. At least some parts of the embodiments described below can be combined together as desired.

[Configuration and Basic Operation]

FIG. 1 shows a configuration of an on-vehicle communication system according to an embodiment of the present disclosure.

With reference to FIG. 1, an on-vehicle communication system 301 includes a switch device 101, and a plurality of on-vehicle devices 111. The on-vehicle communication system 301 is installed in a vehicle 1.

Hereinafter, each of on-vehicle devices 111A, 111B, 111C, 111D, and 111E is also referred to as an on-vehicle device 111. The on-vehicle device 111 is an example of a function unit. The on-vehicle communication system 301 may not necessarily include five on-vehicle devices 111, and may include two, three, four, six, or more on-vehicle devices 111.

Examples of the on-vehicle device 111 include an automated driving ECU (Electronic Control Unit), an image sensor, a radar device, a navigation device, a TCU (Telematics Communication Unit), a central gateway (CGW), and a human-machine interface. The on-vehicle device 111 is communicable with the switch device 101.

The on-vehicle device 111 is not limited to the aforementioned specific examples, and may be any device that is installed in the vehicle 1 and is communicable with the switch device 101.

The switch device 101 and the on-vehicle device 111 are connected to each other through an Ethernet (registered trademark) cable 10, for example. The connection relationship between the switch device 101 and each on-vehicle device 111 in the on-vehicle network of the vehicle 1 is fixed, for example.

The switch device 101 and the on-vehicle device 111 communicate with each other by using the Ethernet cable. Between the switch device 101 and the on-vehicle device 111, communication data is exchanged by using an Ethernet frame according to IEEE802.3, for example.

[On-Vehicle Device]

The on-vehicle device 111 has a function of one or a plurality of applications. The on-vehicle device 111 transmits/receives information related to its own application via the switch device 101.

As an example of the application of the on-vehicle device 111, the on-vehicle device 111, which is an image sensor, periodically takes an image of surroundings of the vehicle 1, and creates image information indicating the result of the image taking, for example.

As another example of the application of the on-vehicle device 111, the on-vehicle device 111, which is a radar device, periodically creates, by using millimeter waves, detection information indicating a result of detection of objects such as a pedestrian around the vehicle 1, for example.

As still another example of the application of the on-vehicle device 111, the on-vehicle device 111, which is an automated driving ECU, supports automated driving, based on the image information received from the image sensor and the detection information received from the radar device, for example.

FIG. 2 shows an example of VID, MAC address, and IP address of each device in the on-vehicle communication system according to the embodiment of the present disclosure.

With reference to FIG. 2, in the on-vehicle network, for example, the on-vehicle devices 111A, 111B, and 111C and the on-vehicle devices 111D and 111E belong to VLANs (Virtual Local Area Networks) different from each other.

In this example, the ID (hereinafter, also referred to as "VID") of the VLAN to which the on-vehicle devices 111A, 111B, and 111C belong is 1. The VID to which the on-vehicle devices 111D and 111E belong is 2.

The switch device 101 and the on-vehicle device 111 each have a MAC (Media Access Control) address and an IP (Internet Protocol) address that are unique thereto.

[Switch Device]

Referring back to FIG. 1, the switch device 101 performs a relay process of relaying communication data between the plurality of on-vehicle devices 111 in the on-vehicle network.

Specifically, in the on-vehicle network, for example, information is transmitted/received by using an IP packet, according to an IP protocol. The IP packet is stored in an Ethernet frame, which is an example of the communication data, and transmitted.

The switch device 101 performs a relay process of relaying the Ethernet frame transmitted between the respective on-vehicle devices 111.

In detail, the switch device 101 operates according to a communication protocol having a plurality of layers. In more detail, the switch device 101 can function as an L2 (layer 2) switch, and relays an Ethernet frame between the on-vehicle devices 111 that belong to the same VLAN. In addition, the switch device 101 can also function as an L3 (layer 3) relay device, and relays an Ethernet frame between the on-vehicle devices 111 that belong to different VLANs.

Figure 3:
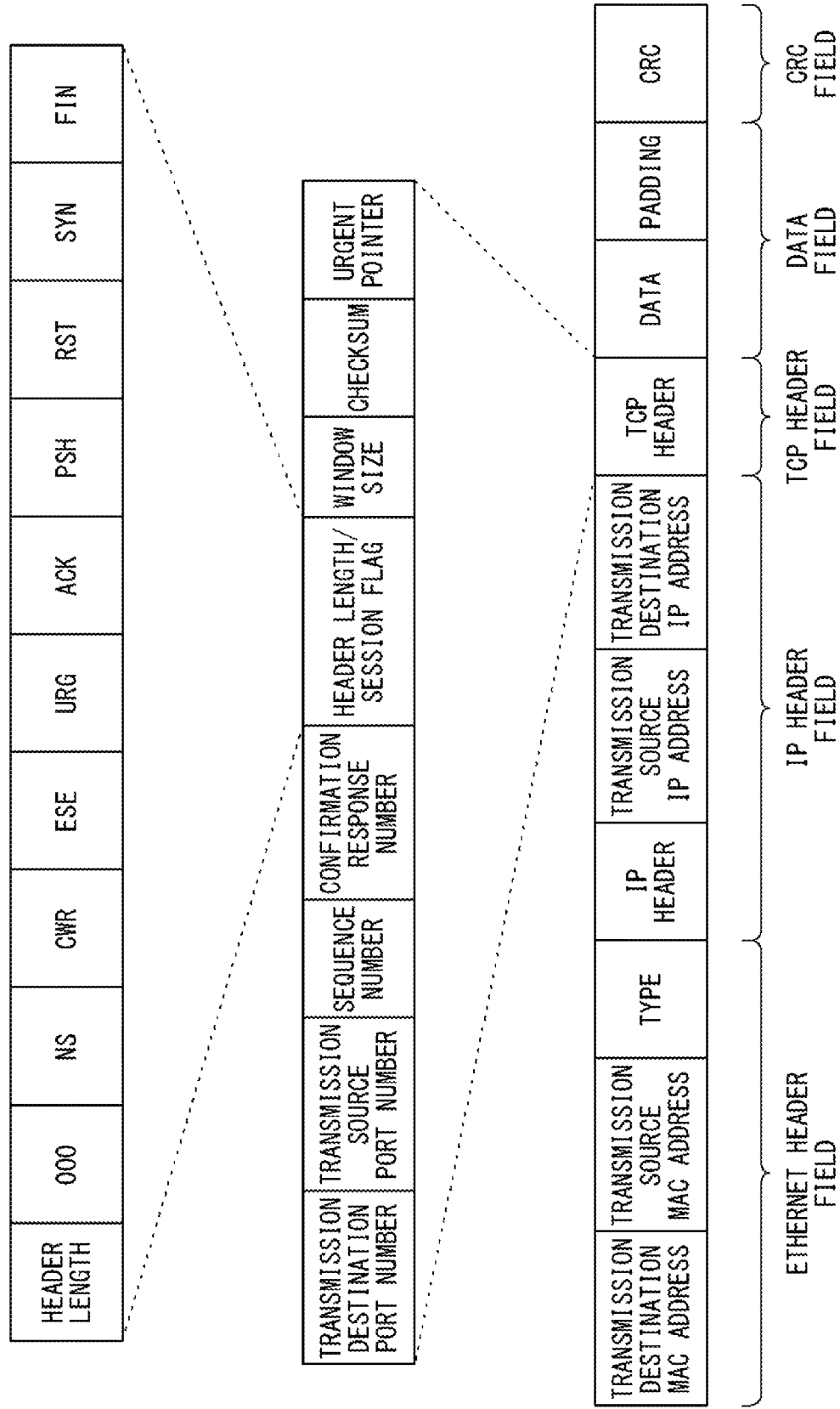
FIG. 3 shows an example of an Ethernet frame transmitted in the on-vehicle communication system according to the embodiment of the present disclosure.

FIG. 3 shows an example of an Ethernet frame transmitted in the on-vehicle communication system according to the embodiment of the present disclosure.

With reference to FIG. 3, the Ethernet frame has an Ethernet header field, an IP header field, a TCP header field, a data field, and a CRC (Cyclic Redundancy Check) field.

In the Ethernet header field, a transmission destination MAC address, a transmission source MAC address, and a type are stored. In the IP header field, an IP header, a transmission source IP address, and a transmission destination IP address are stored. In the data field, arbitrary data are stored, and padding is stored according to need. In the CRC field, a CRC value is stored.

In the TCP header field, a transmission destination port number, a transmission source port number, a sequence number, a confirmation response number, a header length and session flag, a window size, a checksum, and an urgent pointer are stored.

In the field of header length and session flag, a header length, an NS (Nonce Sum) flag, a CWR (Congestion Window Reduced) flag, an ESE flag, an URG (Urgent) flag, an ACK (Acknowledgment) flag, a PSH (Push) flag, an RST (Reset) flag, an SYN (Synchronize) flag, and an FIN (Fin) flag are stored.

For example, when the on-vehicle device 111B transmits an IP packet including the image information or the detection information to the on-vehicle device 111C, this IP packet includes IP-B and IP-C as the transmission source IP address and the transmission destination IP address, respectively.

Since the on-vehicle device 111B and the on-vehicle device 111C belong to the same VLAN, the on-vehicle device 111B writes 1, MAC-C, and MAC-B, in the Ethernet frame, as the VID, the transmission destination MAC address, and the transmission source MAC address, respectively.

The on-vehicle device 111B transmits, to the switch device 101, the Ethernet frame having the IP packet stored therein.

Upon receiving the Ethernet frame from the on-vehicle device 111B, the switch device 101 performs a layer-2 switch process on the received Ethernet frame, thereby transmitting this Ethernet frame to the on-vehicle device 111C.

Meanwhile, for example, when the on-vehicle device 111B transmits the IP packet including the image information or the detection information to the on-vehicle device 111D, this IP packet includes IP-B and IP-D as the transmission source IP address and the transmission destination IP address, respectively.

Since the on-vehicle device 111B and the on-vehicle device 111D belong to different VLANs, the on-vehicle device 111B writes 1, MAC-G (MAC address of the switch device 101 as a default gateway), and MAC-B, in the Ethernet frame, as the VID, the transmission destination MAC address, and the transmission source MAC address, respectively.

The on-vehicle device 111B transmits, to the switch device 101, the Ethernet frame having the IP packet stored therein.

Upon receiving the Ethernet frame from the on-vehicle device 111B, the switch device 101 performs a layer-3 relay process on the received Ethernet frame, thereby transmitting the Ethernet frame to the on-vehicle device 111D.

Upon receiving the Ethernet frame via the switch device 101, the on-vehicle device 111C or 111D returns the Ethernet frame in which the ACK flag is set to 1 (hereinafter, also referred to as "ACK frame") to the on-vehicle device 111B.

Upon receiving the ACK frame from the on-vehicle device 111C or 111D, the on-vehicle device 111B transmits a next Ethernet frame to the on-vehicle device 111C or 111D.

The on-vehicle device 111C or 111D notifies the on-vehicle device 111B of transmission size information regarding the amount of data that the on-vehicle device 111C or 111D can receive next. The on-vehicle device 111B transmits Ethernet frames, per unit time, corresponding to the data amount according to the notified transmission size information.

Specifically, for example, the on-vehicle device 111C or 111D transmits an ACK frame in which the transmission size information, e.g., a window size, is stored. Upon receiving the ACK frame, the on-vehicle device 111B transmits, to the on-vehicle device 111C or 111D, Ethernet frames having, as an upper limit, the data amount according to the window size stored in the ACK frame.

[Configuration of Switch Device]

Figure 4:
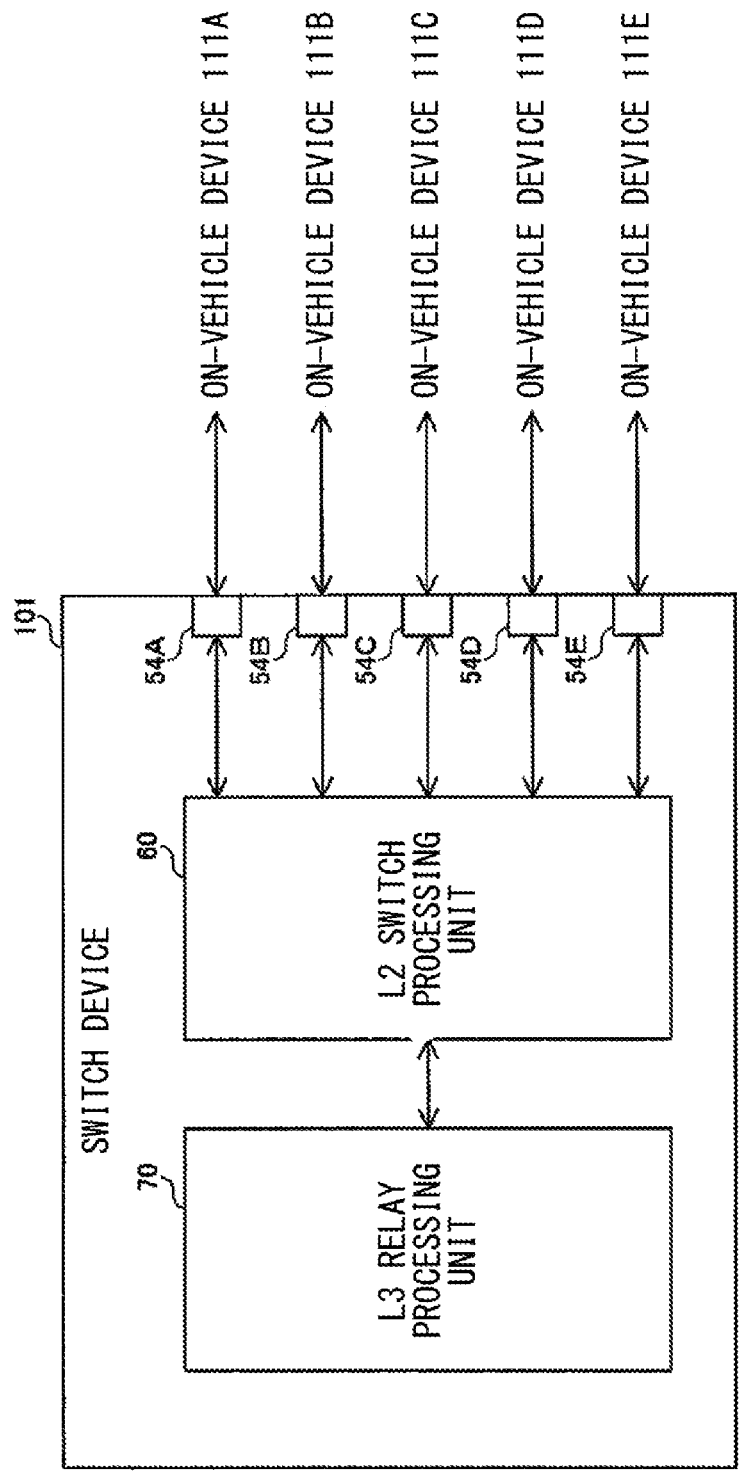
FIG. 4 shows a configuration of a switch device in the on-vehicle communication system according to the embodiment of the present disclosure.

FIG. 4 shows a configuration of a switch device in the on-vehicle communication system according to the embodiment of the present disclosure.

With reference to FIG. 4, the switch device 101 includes an L2 switch processing unit 60, an L3 relay processing unit 70, and communication ports 54A, 54B, 54C, 54D, and 54E each being referred to also as a communication port 54.

The switch device 101 may not necessarily include five communication ports 54, and may include two, three, four, six, or more communication ports 54.

The communication port 54 is a terminal to which an Ethernet cable 10 can be connected, for example. The communication port 54 may be a terminal of an integrated circuit.

Each of the plurality of communication ports 54 is connected to any one of the plurality of on-vehicle devices 111 via an Ethernet cable 10. In addition, each of the plurality of communication ports 54 is associated with a VLAN, for example.

The L2 switch processing unit 60 operates as an L2 switch, for example, and relays an Ethernet frame between the on-vehicle devices 111 that belong to the same VLAN.

The L3 relay processing unit 70 operates as an L3 switch, for example, and relays an Ethernet frame between the on-vehicle devices 111 that belong to different VLANs.

Figure 5:
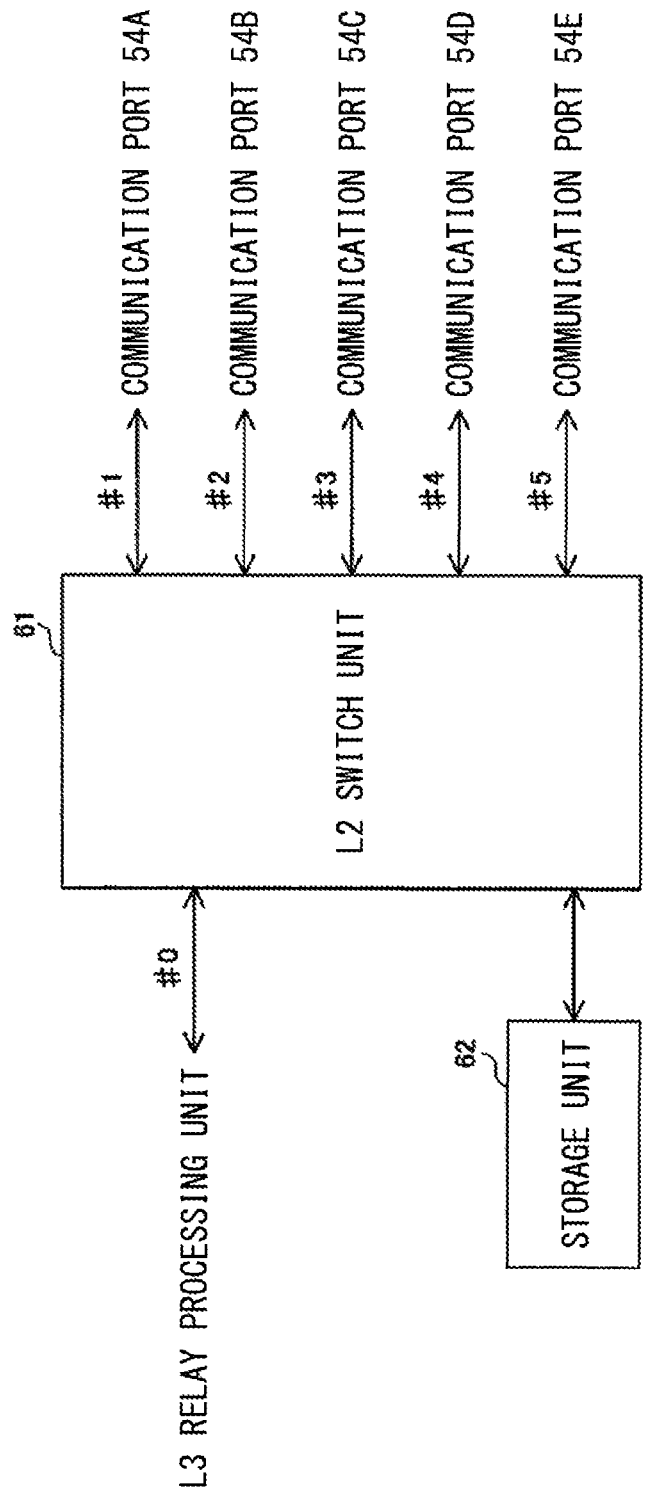
FIG. 5 shows a configuration of an L2 switch processing unit in the switch device according to the embodiment of the present disclosure.

FIG. 5 shows a configuration of an L2 switch processing unit in the switch device according to the embodiment of the present disclosure.

With reference to FIG. 5, an L2 switch processing unit 60 includes an L2 switch unit 61 and a storage unit 62.

The L2 switch unit 61 performs a layer-2 switch process on an Ethernet frame received via the communication port 54. Upon receiving the Ethernet frame to be relayed, the L2 switch unit 61 stores the received Ethernet frame in the storage unit 62.

Figure 6:
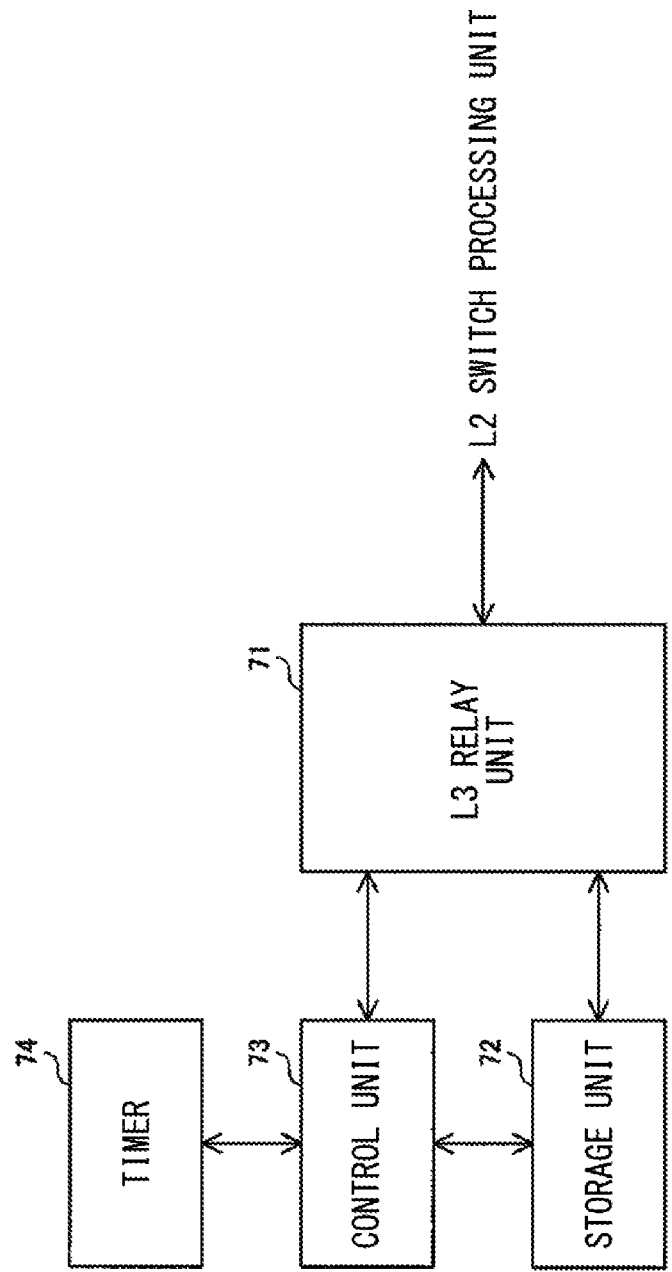
FIG. 6 shows a configuration of an L3 relay processing unit in the switch device according to the embodiment of the present disclosure.

FIG. 6 shows a configuration of an L3 relay processing unit in the switch device according to the embodiment of the present disclosure.

With reference to FIG. 6, an L3 relay processing unit 70 includes an L3 relay unit 71, a storage unit 72, a control unit 73, and a timer 74.

The L3 relay unit 71 performs a layer-3 switch process on an Ethernet frame received from the L2 switch unit 61. Upon receiving the Ethernet frame to be relayed, the L3 relay unit 71 stores the received Ethernet frame in the storage unit 72. The storage unit 72 is provided with a queue for each application, for example.

Figure 7:
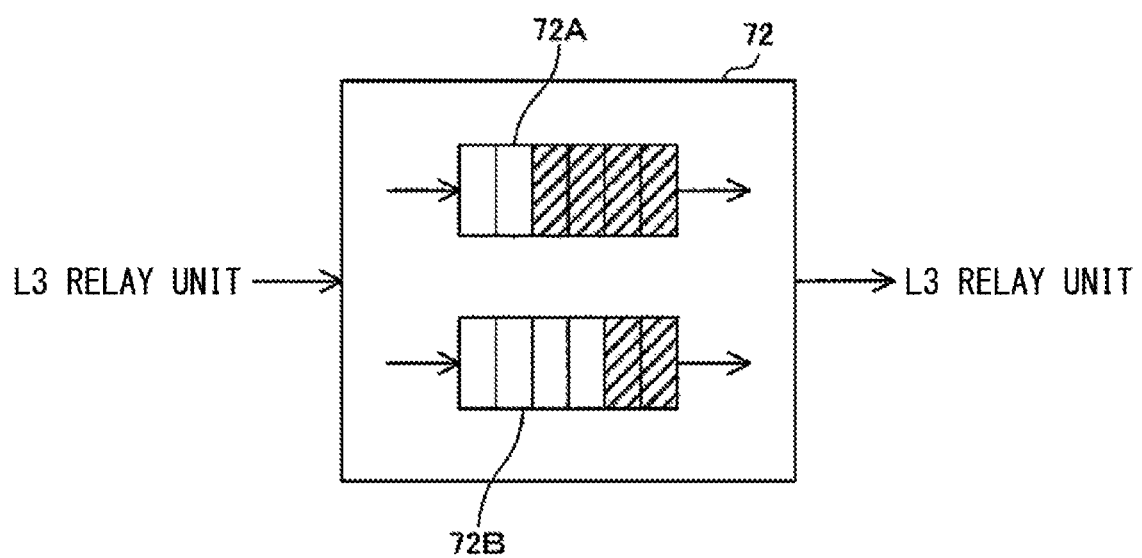
FIG. 7 shows data stored in a storage unit in the L3 relay processing unit in the switch device according to the embodiment of the present disclosure.

FIG. 7 shows data stored in the storage unit in the L3 relay processing unit in the switch device according to the embodiment of the present disclosure.

With reference to FIG. 7, the storage unit 72 is provided with a queue 72A corresponding to a certain application, and a queue 72B corresponding to another application. The L3 relay unit 71 identifies a corresponding application by referring to, for example, a transmission source port number included in an Ethernet frame, and distributes the Ethernet frame to a queue corresponding to the application to store the Ethernet frame in the storage unit 72. The storage unit 72 may be provided with three or more queues.

The control unit 73 determines the state of the storage unit 72, and adjusts, for each application, the throughput of communication data to be transmitted from the on-vehicle device 111, based on the determination result. How the control unit 73 adjusts the throughput of communication data for each application will be described later in detail.

[Layer-2 Switch Process]

The L2 switch unit 61 can perform a relay process according to, for example, "layer 2", without the intervention of the L3 relay processing unit 70.

With reference to FIG. 5, the L2 switch unit 61 has a plurality of terminals to be respectively connected to the L3 relay processing unit 70 and the communication ports 54A, 54B, 54C, 54D, and 54E, for example. Each terminal is assigned a unique logical port number.

In this example, logical port numbers of the terminals connected to the L3 relay processing unit 70 and the communication ports 54A, 54B, 54C, 54D, and 54E are #0, #1, #2, #3, #4, and #5, respectively.

The L2 switch unit 61 holds an ARL (Address Resolution Logic) table, for example.

The content of the ARL table is determined in advance by, for example, a user, based on the connection relationship which is fixed in the on-vehicle network as described above.

The ARL table indicates, for example, the correspondence between a transmission destination MAC address and an output destination. Here, the output destination is a logical port number.

Specifically, the ARL table includes the correspondence between the MAC address of the on-vehicle device 111 and the logical port number of the terminal of which the connection destination is the on-vehicle device 111, and the correspondence between the MAC address of the switch device 101 and the logical port number of the L3 relay processing unit 70.

Upon receiving an Ethernet frame via the communication port 54, the L2 switch unit 61 stores the received Ethernet frame in the storage unit 62, and acquires the transmission destination MAC address included in the Ethernet frame.

The L2 switch unit 61 acquires, from the ARL table, the logical port number corresponding to the acquired transmission destination MAC address. Specifically, as for an Ethernet frame transmitted within the same VLAN, such as an Ethernet frame transmitted from the on-vehicle device 111B to the on-vehicle device 111C, the L2 switch unit 61 acquires any one of #1 to #5 as the logical port number corresponding to the acquired transmission destination MAC address.

Then, the L2 switch unit 61 acquires the corresponding Ethernet frame from the storage unit 62, and transmits the acquired Ethernet frame from the terminal having the acquired logical port number, to the on-vehicle device 111 via the communication port 54.

On the other hand, as for an Ethernet frame transmitted between different VLANs, such as an Ethernet frame transmitted from the on-vehicle device 111A to the on-vehicle device 111E, the L2 switch unit 61 acquires #0 as the logical port number corresponding to the acquired transmission destination MAC address.

Then, the L2 switch unit 61 acquires the corresponding Ethernet frame from the storage unit 62, and outputs the acquired Ethernet frame to the L3 relay processing unit 70.

[Layer-3 Relay Process]

The L3 relay unit 71 performs a relay process via the L2 switch processing unit 60. Specifically, the L3 relay unit 71 performs the relay process according to "layer 3" which is of a higher order than "layer 2".

The L3 relay unit 71 performs a layer-3 relay process (hereinafter, also referred to as "L3 relay process") on an Ethernet frame received from the L2 switch processing unit 60.

In detail, the L3 relay unit 71 receives an Ethernet frame from the L2 switch processing unit 60, and rewrites the transmission destination MAC address and the transmission source MAC address in the received Ethernet frame.

In more detail, the L3 relay unit 71 holds, for example, table information TIA indicating the correspondence between an IP address and a MAC address for use in the layer-3 relay process.

Specifically, the L3 relay unit 71 holds the table information TIA including: a routing table indicating the correspondence between a transmission destination network, such as VLAN, which is a relay target thereof, and a VID; and an ARP (Address Resolution Protocol) table indicating the correspondence between an IP address and a MAC address for each VID.

The content of the table information TIA is determined in advance by, for example, the user, based on the connection relationship which is fixed in the on-vehicle network as described above.

Upon receiving the Ethernet frame from the L2 switch processing unit 60, the L3 relay unit 71 stores the received Ethernet frame in the storage unit 72. Furthermore, the L3 relay unit 71 acquires the transmission destination IP address from the IP packet included in the received Ethernet frame, and performs, for example, subnet mask calculation on the acquired transmission destination IP address to identify the VLAN.

The L3 relay unit 71 acquires the VID corresponding to the identified VLAN with reference to the routing table.

Then, the L3 relay unit 71 refers to the ARP table corresponding to the acquired VID, and acquires, from the ARP table, the MAC address corresponding to the transmission destination IP address.

The L3 relay unit 71 acquires the Ethernet frame from the storage unit 72, and rewrites the VID, the transmission destination MAC address, and the transmission source MAC address in the acquired Ethernet frame, to the acquired VID, the acquired MAC address, and the MAC address of the switch device 101, respectively, and then outputs the Ethernet frame to the L2 switch processing unit 60.

[Specific Example of L3 Relay Process]

Figure 8:
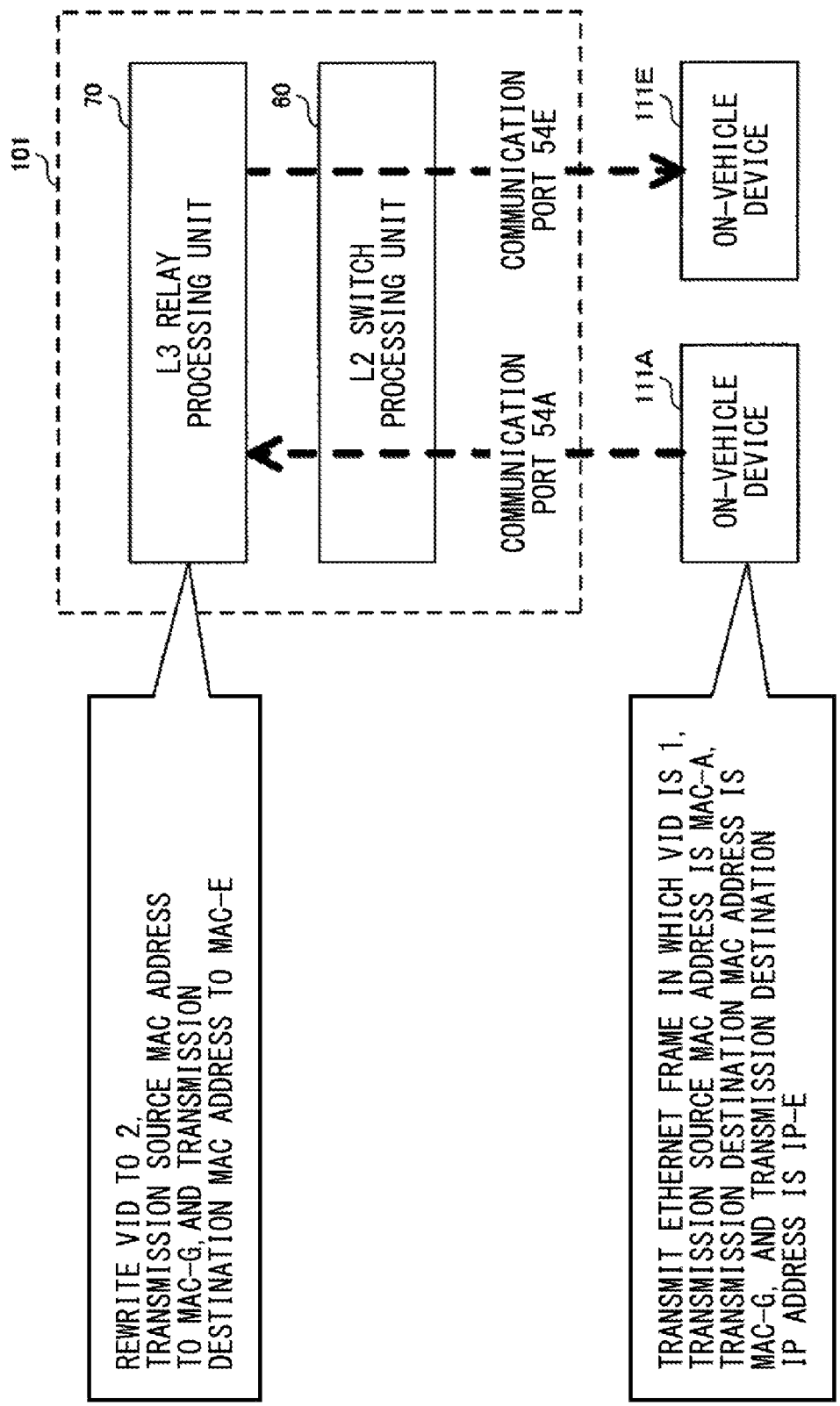
FIG. 8 shows an example of a transmission path for an Ethernet frame subjected to an L3 relay process, in the on-vehicle communication system according to the embodiment of the present disclosure.

FIG. 8 shows an example of a transmission path for an Ethernet frame subjected to the L3 relay process, in the on-vehicle communication system according to the embodiment of the present disclosure.

With reference to FIG. 8, for example, a situation in which the on-vehicle device 111A transmits an Ethernet frame directed to the on-vehicle device 111E, is assumed.

In this case, the on-vehicle device 111A transmits, to the switch device 101, an Ethernet frame in which 1, MAC-A, MAC-G, and IP-E are stored as the VID, the transmission source MAC address, the transmission destination MAC address, and the transmission destination IP address, respectively.

Upon receiving the Ethernet frame from the on-vehicle device 111A via the communication port 54A and the L2 switch processing unit 60, the L3 relay processing unit 70 in the switch device 101 performs the L3 relay process on the received Ethernet frame, based on the table information TIA.

In more detail, the L3 relay unit 71 receives the Ethernet frame from the L2 switch processing unit 60, and stores the received Ethernet frame in the storage unit 72. Then, the L3 relay unit 71 acquires the Ethernet frame from the storage unit 72, and rewrites the VID, the transmission source MAC address, and the transmission destination MAC address included in the acquired Ethernet frame, to 2, MAC-G, and MAC-E, respectively. The L3 relay unit 71 outputs the rewritten Ethernet frame to the L2 switch processing unit 60.

Upon receiving the Ethernet frame from the L3 relay processing unit 70, the L2 switch processing unit 60 acquires, based on the ARL table, the logical port number "#5" corresponding to the transmission destination MAC address included in the received Ethernet frame.

The L2 switch processing unit 60 transmits the Ethernet frame from the terminal having the acquired logical port number "#5" via the communication port 54E. Thus, the Ethernet frame is transmitted to the on-vehicle device 111E via the communication port 54E.

[Problem]

Incidentally, when the switch device 101 receives a large amount of communication data, e.g., Ethernet frames, from the on-vehicle device 111, overflow is likely to occur in the storage unit 72 of the L3 relay processing unit 70, for example.

In order to eliminate such overflow of the storage unit 72, for example, a pause frame may be transmitted from the switch device 101 to the on-vehicle device 111 to reduce the frequency of transmission of Ethernet frames from the on-vehicle device 111.

For example, priority levels may be set according to the types of the on-vehicle devices 111 which are the Ethernet frame transmission sources, and a pause frame may be transmitted to an on-vehicle device 111 having a lower priority level.

In this case, since the frequency of transmission of Ethernet frames from the on-vehicle device 111 having the lower priority level is reduced, it is possible to preferentially relay Ethernet frames from an on-vehicle device 111 having a higher priority level. Thus, the likelihood of overflow of the storage unit 72 can be reduced.

However, if the on-vehicle device 111 has functions of a plurality of applications, it is not possible to relay Ethernet frames according to the priority levels of the applications such that an Ethernet frame corresponding to an application having a higher priority level is preferentially relayed.

[Adjustment of Throughput]

The control unit 73 determines the state of the storage unit 72. In more detail, the control unit 73 periodically or non-periodically monitors the storage unit 72, and determines the state of the storage unit 72 by referring to the amount of data or the number of Ethernet frames stored in the storage unit 72. The control unit 73 may monitor the L3 relay unit 71, and when the L3 relay unit 71 has received an Ethernet frame from the L2 switch processing unit 60, the control unit 73 may determine the state of the storage unit 72 by referring to the amount of data or the number of Ethernet frames stored in the storage unit 72.

Based on the determination result, the control unit 73 adjusts, for each application, the throughput of communication data to be transmitted from the on-vehicle device 111. The throughput of communication data is proportional to a value obtained by dividing the window size by RTT (Round Trip Time).

[Operation Flow]

Each device in the on-vehicle communication system 301 includes a computer including a memory. An arithmetic processing unit such as a CPU in the computer reads out, from the memory, a program including a part or all of steps in the following flowchart and sequence and executes the program. Programs of the plurality of devices can each be installed from the outside. The programs of the plurality of devices are each distributed in a state of being stored in a storage medium.

[Suspension of Relay of ACK Frame]

For example, the switch device 101 delays relay of an ACK from a transmission-destination on-vehicle device 111 to increase the RTT between on-vehicle devices 111, thereby adjusting the throughput of communication data for each application.

For example, the switch device 101 delays relay of an ACK frame received from the transmission-destination on-vehicle device 111. In more detail, the control unit 73 delays the transmission timing of the ACK frame by the L3 relay unit 71.

Referring back to FIG. 8, for example, a situation in which the on-vehicle device 111A has two applications 1, 2 and an Ethernet frame corresponding to each application is transmitted to the on-vehicle device 111E, is assumed.

It is assumed that the priority level of the application 1 is higher than that of the application 2, and an Ethernet frame F1 corresponding to the application 1 should be preferentially relayed and transmitted to the on-vehicle device 111E, over an Ethernet frame F2 corresponding to the application 2.

In accordance with the state of the storage unit 72, the control unit 73 determines a delay time (hereinafter, also referred to as "relay delay time") of the transmission timing of the ACK frame by the L3 relay unit 71, thereby adjusting the timing to relay the ACK frame.

FIG. 9 shows an example of a delay time table held by the control unit in the switch device according to the embodiment of the present disclosure.

With reference to FIG. 9, for example, the control unit 73 holds a delay time table indicating the correspondence, for each application, between the amount C of data stored in the storage unit 72 (hereinafter, also referred to as "usage amount C of the storage unit 72") and a relay delay time T. The control unit 73 determines the relay delay time with reference to the delay time table.

Specifically, for example, in the state where the usage amount C1 of the storage unit 72 is equal to or greater than 1000 kilobytes and less than 1500 kilobytes, the relay delay time T1 of the application 1 is 10 milliseconds, and the relay delay time T2 of the application 2 is 20 milliseconds. Meanwhile, for example, in the state where the usage amount C1 of the storage unit 72 is equal to or greater than 1500 kilobytes and less than 2000 kilobytes, the relay delay time T1 of the application 1 is 15 milliseconds, and the relay delay time T2 of the application 2 is 30 milliseconds.

That is, when the usage amount C1 of the storage unit 72 is equal to or greater than 1000 kilobytes, the control unit 73 determines that the transmission timing of the ACK frame by the L3 relay unit 71 needs to be delayed. When the usage amount C1 of the storage unit 72 is less than 1000 kilobytes, the control unit 73 determines that the transmission timing of the ACK frame by the L3 relay unit 71 need not be delayed.

Figure 10:
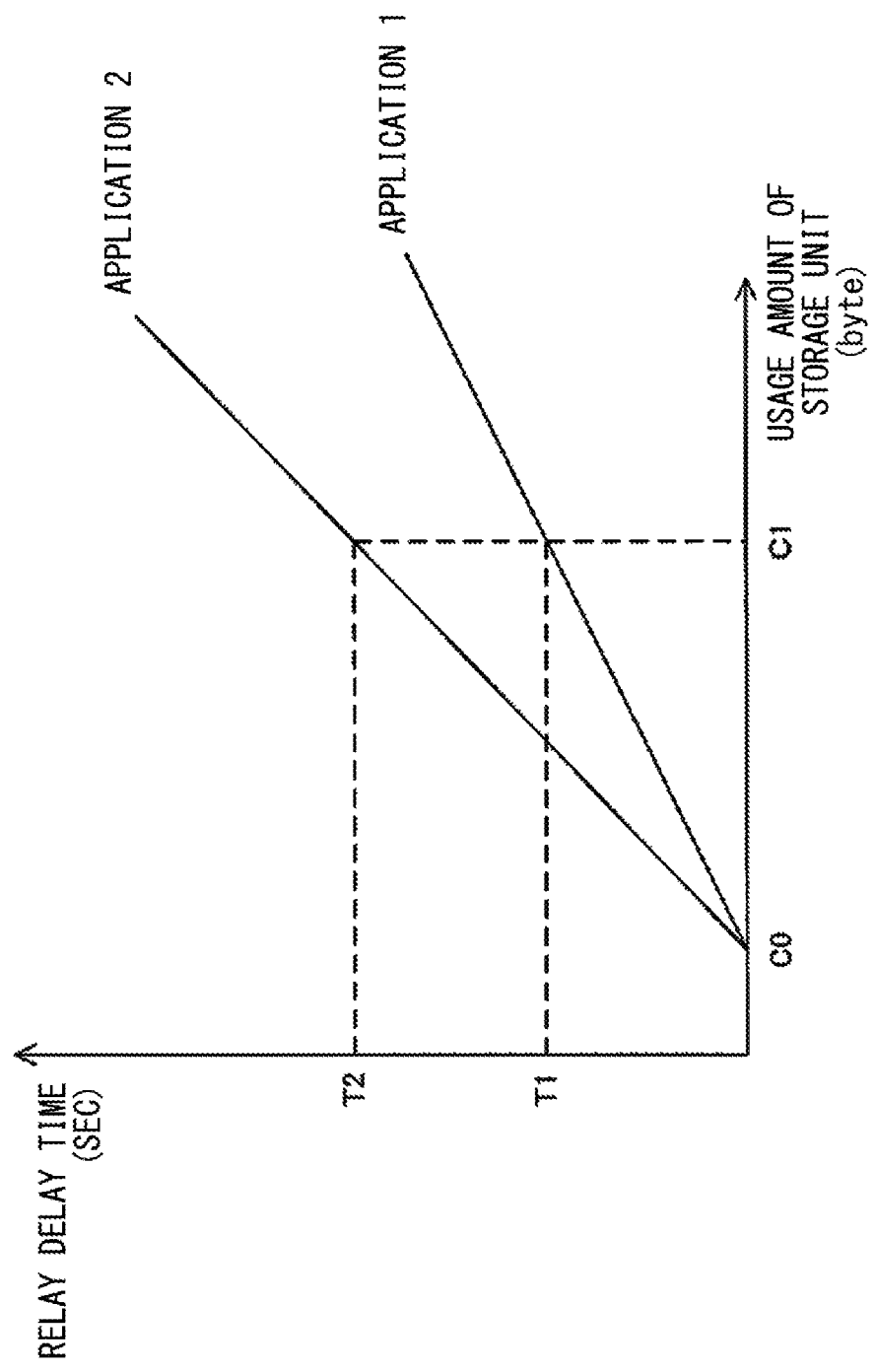
FIG. 10 shows an example of a relationship between a usage amount of the storage unit and a delay time of an ACK frame, in the switch device according to the embodiment of the present disclosure.

FIG. 10 shows an example of the relationship between the usage amount of the storage unit and the delay time of the ACK frame in the switch device according to the embodiment of the present disclosure. In FIG. 10, the vertical axis indicates the relay delay time (seconds) and the horizontal axis indicates the usage amount (bytes) of the storage unit.

With reference to FIG. 10, the delay time table held by the control unit 73 is set as follows. That is, when the usage amount C of the storage unit 72 is equal to or greater than a predetermined value C0, the relay delay time T is proportional to the usage amount C of the storage unit 72, and the amount of increase in the relay delay time T with respect to an increase in the usage amount C of the storage unit 72 is greater as the priority level of the application is lower.

Figure 11:
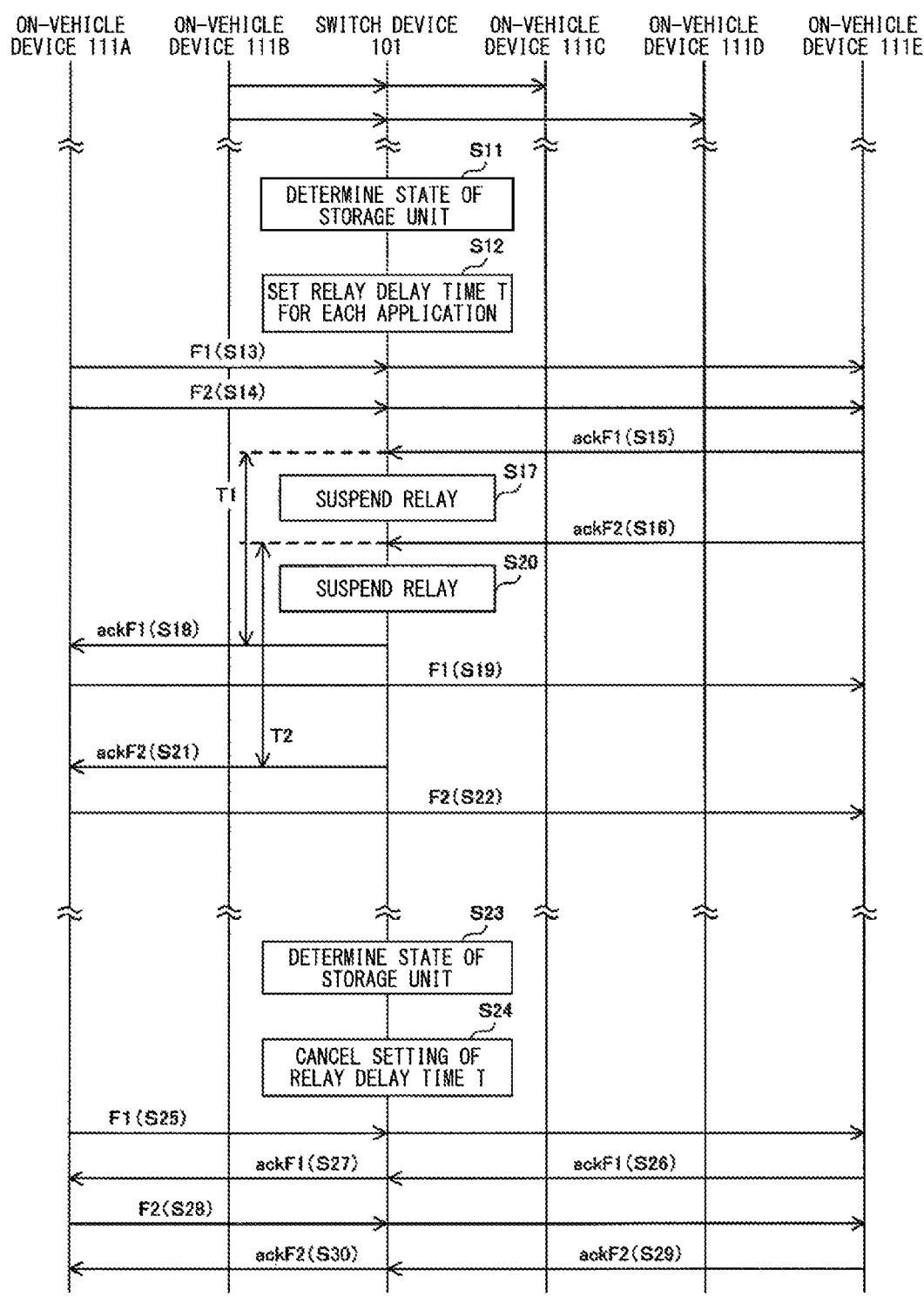
FIG. 11 shows an example of a sequence of throughput adjustment for communication data, in the on-vehicle communication system according to the embodiment of the present disclosure.

FIG. 11 shows an example of a sequence of throughput adjustment for communication data, in the on-vehicle communication system according to the embodiment of the present disclosure.

With reference to FIG. 11, firstly, in the switch device 101, the control unit 73 determines the state of the storage unit 72 at a predetermined timing (step S11).

Upon determining, based on the determined state of the storage unit 72, that the transmission timing of an ACK frame by the L3 relay unit 71 needs to be delayed, the control unit 73 sets the relay delay time T for each application. Specifically, the control unit 73 sets the relay delay time T with reference to the delay time table (step S12).

Next, the on-vehicle device 111A transmits an Ethernet frame F1 corresponding to the application 1 to the on-vehicle device 111E via the switch device 101 (step S13).

Next, the on-vehicle device 111A transmits an Ethernet frame F2 corresponding to the application 2 to the on-vehicle device 111E via the switch device 101 (step S14).

Upon receiving the Ethernet frame F1, the on-vehicle device 111E transmits an ACK frame ackF1 for the Ethernet frame F1 to the switch device 101 (step S15).

Upon receiving the Ethernet frame F2, the on-vehicle device 111E transmits an ACK frame ackF2 for the Ethernet frame F2 to the switch device 101 (step S16).

Upon receiving the ACK frame ackF1, the switch device 101 suspends transfer of the ACK frame ackF1 for the relay delay time T1 (step S17), and thereafter transmits the ACK frame ackF1 to the on-vehicle device 111A (step S18).

Upon receiving the ACK frame ackF1, the on-vehicle device 111A transmits a next Ethernet frame F1 to the on-vehicle device 111E via the switch device 101 (step S19).

Meanwhile, upon receiving the ACK frame ackF2, the switch device 101 suspends transfer of the ACK frame ackF2 for the relay delay time T2 (step S20), and thereafter transmits the ACK frame ackF2 to the on-vehicle device 111A (step S21).

Upon receiving the ACK frame ackF2, the on-vehicle device 111A transmits a next Ethernet frame F2 to the on-vehicle device 111E via the switch device 101 (step S22).

Next, the control unit 73 determines the state of the storage unit 72 at a predetermined timing after a predetermined time has elapsed from when the state of the storage unit 72 was determined last time (step S23).

Upon determining, based on the determined state of the storage unit 72, that the transmission timing of the ACK frame by the L3 relay unit 71 need not be delayed, the control unit 73 cancels the setting of the relay delay time T (step S24).

Next, the on-vehicle device 111A transmits an Ethernet frame F1 corresponding to the application 1 to the on-vehicle device 111E via the switch device 101 (step S25).

Upon receiving the Ethernet frame F1, the on-vehicle device 111E transmits an ACK frame ackF1 for the Ethernet frame F1 to the switch device 101 (step S26).

Upon receiving the ACK frame ackF1, the switch device 101 transmits the ACK frame ackF1 to the on-vehicle device 111A without suspending relay of the ACK frame ackF1 (step S27).

Next, the on-vehicle device 111A transmits an Ethernet frame F2 corresponding to the application 2 to the on-vehicle device 111E via the switch device 101 (step S28).

Upon receiving the Ethernet frame F2, the on-vehicle device 111E transmits an ACK frame ackF2 for the Ethernet frame F2 to the switch device 101 (step S29).

Upon receiving the ACK frame ackF2, the switch device 101 transmits the ACK frame ackF2 to the on-vehicle device 111A without suspending relay of the ACK frame ackF2 (step S30).

In more detail, in step S17, the L3 relay unit 71 in the switch device 101 receives the ACK frame ackF1 via the L2 switch processing unit 60, and stores the received ACK frame ackF1 in the storage unit 72. When the L3 relay unit 71 has received the ACK frame ackF1, the control unit 73 sets the set relay delay time T1 on the timer 74.

When the relay delay time T1 set on the timer 74 has elapsed, the control unit 73 receives notification, from the timer 74, that the relay delay time T1 has elapsed, and notifies the L3 relay unit 71 of the elapse of the relay delay time T1. Upon receiving the notification from the control unit 73, the L3 relay unit 71 acquires the ACK frame ackF1 from the storage unit 72, rewrites the VID, etc., included in the acquired ACK frame ackF1, and outputs the ACK frame ackF1 to the L2 switch processing unit 60.

In step S20, the L3 relay unit 71 in the switch device 101 receives the ACK frame ackF2 via the L2 switch processing unit 60, and stores the received ACK frame ackF2 in the storage unit 72. When the L3 relay unit 71 has received the ACK frame ackF2, the control unit 73 sets the set relay delay time T2 on the timer 74.

When the relay delay time T2 set on the timer 74 has elapsed, the control unit 73 receives notification, from the timer 74, that the relay delay time T2 has elapsed, and notifies the L3 relay unit 71 of the elapse of the relay delay time T2. Upon receiving the notification from the control unit 73, the L3 relay unit 71 acquires the ACK frame ackF2 from the storage unit 72, rewrites the VID, etc., included in the acquired ACK frame ackF2, and outputs the ACK frame ackF2 to the L2 switch processing unit 60.

Thus, the switch device 101 adjusts the timing to transmit an ACK frame to the destination on-vehicle device 111, according to the usage amount of the storage unit 72.

[Change of Window Size]

For example, the switch device 101 changes the content of transmission size information received from a transmission-destination on-vehicle device 111 to adjust the amount of communication data, per unit time, to be transmitted next from a transmission-source on-vehicle device 111, thereby adjusting the throughput of communication data for each application.

For example, the switch device 101 changes the window size in an ACK frame received from the transmission-destination on-vehicle device 111. In more detail, the control unit 73 causes the L3 relay unit 71 to change the window size in the ACK frame.

The control unit 73 determines the amount of reduction of the window size according to the state of the storage unit 72, and adjusts the data amount of an Ethernet frame to be transmitted next.

FIG. 12 shows an example of a window size table held by the control unit in the switch device according to the embodiment of the present disclosure.

With reference to FIG. 12, for example, the control unit 73 holds the window size table indicating the correspondence, for each application, between the usage amount C of the storage unit 72 and the reduction amount W of the window size. The control unit 73 determines the reduction amount W of the window size with reference to the window size table, and adjusts the upper limit of the data amount of the Ethernet frame to be transmitted next.

Specifically, for example, when the usage amount C1 of the storage unit 72 is equal to or greater than 1000 kilobytes and less than 1500 kilobytes, the reduction amount W1 of the window size of the application 1 is 1000 bytes, and the reduction amount W2 of the window size of the application 2 is 2000 bytes. Meanwhile, for example, when the usage amount C1 of the storage unit 72 is equal to or greater than 1500 kilobytes and less than 2000 kilobytes, the reduction amount W1 of the window size of the application 1 is 1500 bytes, and the reduction amount W2 of the window size of the application 2 is 3000 bytes.

Figure 13:
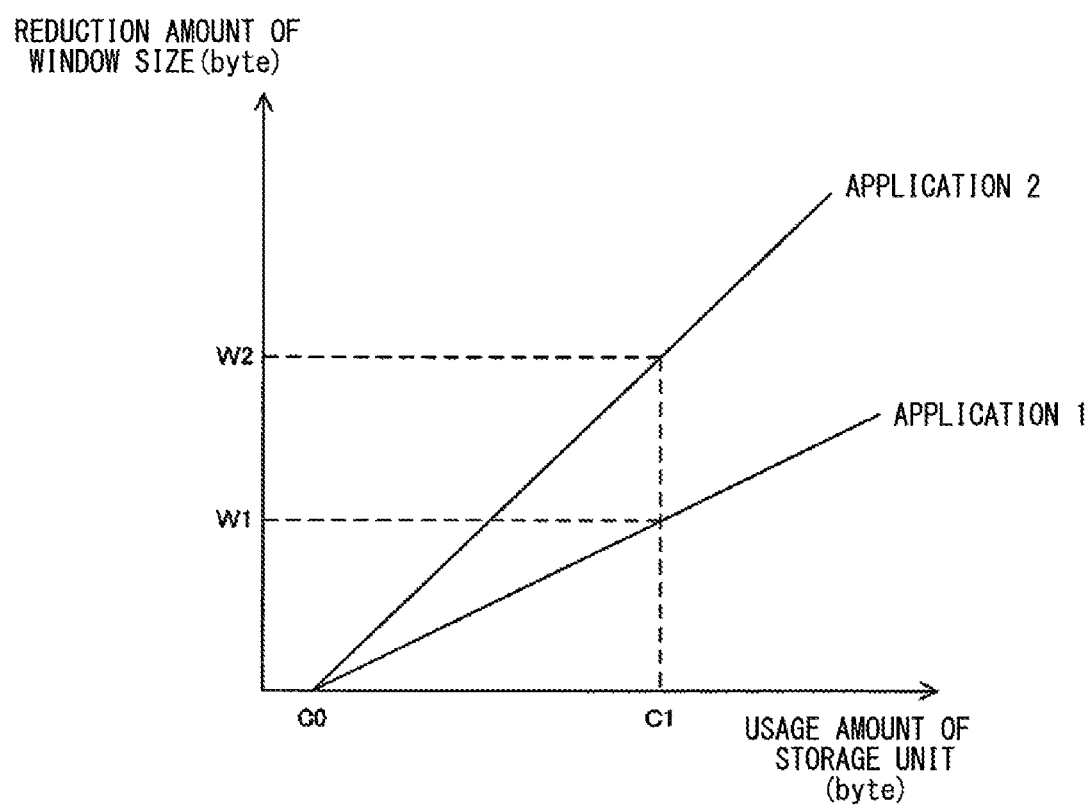
FIG. 13 shows an example of a relationship between a usage amount of the storage unit and a reduction amount of a window size, in the switch device according to the embodiment of the present disclosure.

FIG. 13 shows an example of the relationship between the usage amount of the storage unit and the reduction amount of the window size in the switch device according to the embodiment of the present disclosure. In FIG. 13, the vertical axis indicates the reduction amount (bytes) of the window size, and the horizontal axis indicates the usage amount (bytes) of the storage unit.

That is, when the usage amount C1 of the storage unit 72 is equal to or greater than 1000 kilobytes, the control unit 73 determines that the window size needs to be reduced. When the usage amount C1 of the storage unit 72 is less than 1000 kilobytes, the control unit 73 determines that the window size need not be reduced.

With reference to FIG. 13, the window size table held by the control unit 73 is set as follows. That is, when the usage amount C of the storage unit 72 is equal to or greater than a predetermined value C0, the reduction amount W of the window size is proportional to the usage amount C of the storage unit 72, and the amount of increase in the reduction amount W of the window size with respect to an increase in the usage amount C of the storage unit 72 is greater as the priority level of the application is lower.

Figure 14:
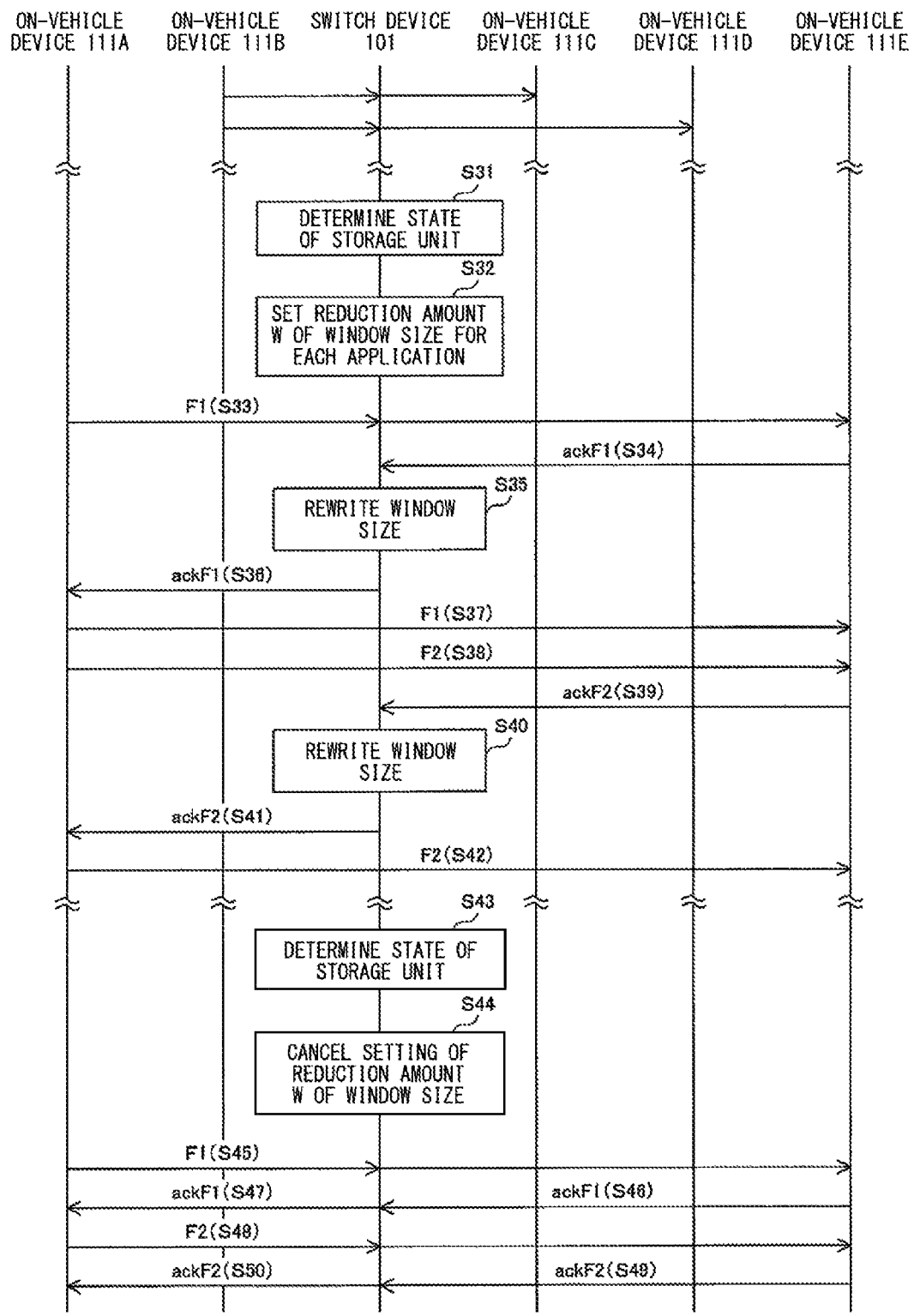
FIG. 14 shows an example of a sequence of throughput adjustment for communication data, in the on-vehicle communication system according to the embodiment of the present disclosure.

FIG. 14 shows an example of a sequence of throughput adjustment for communication data, in the on-vehicle communication system according to the embodiment of the present disclosure.

With reference to FIG. 14, firstly, in the switch device 101, the control unit 73 determines the state of the storage unit 72 at a predetermined timing (step S31).

Upon determining, based on the determined state of the storage unit 72, that the window size needs to be reduced, the control unit 73 sets the reduction amount W of the window size for each application. Specifically, the control unit 73 determines the reduction amount W with reference to the window size table (step S32).

Next, the on-vehicle device 111A transmits an Ethernet frame F1 corresponding to the application 1 to the on-vehicle device 111E via the switch device 101 (step S33).

Upon receiving the Ethernet frame F1, the on-vehicle device 111E transmits an ACK frame ackF1 for the Ethernet frame F1 to the switch device 101 (step S34).

Upon receiving the ACK frame ackF1, the switch device 101 rewrites the window size included in the TCP header field of the ACK frame ackF1 (step S35), and transmits the rewritten ACK frame ackF1 to the on-vehicle device 111A (step S36).

Upon receiving the ACK frame ackF1, the on-vehicle device 111A transmits a next Ethernet frame F1 to the on-vehicle device 111E via the switch device 101 with, as an upper limit, the data amount specified by the window size included in the TCP header field of the ACK frame ackF1 (step S37).

Next, the on-vehicle device 111A transmits an Ethernet frame F2 corresponding to the application 2 to the on-vehicle device 111E via the switch device 101 (step S38).

Upon receiving the Ethernet frame F2, the on-vehicle device 111E transmits an ACK frame ackF2 for the Ethernet frame F2 to the switch device 101 (step S39).

Upon receiving the ACK frame ackF2, the switch device 101 rewrites the window size included in the TCP header field of the ACK frame ackF2 (step S40), and transmits the rewritten ACK frame ackF2 to the on-vehicle device 111A (step S41).

Upon receiving the ACK frame ackF2, the on-vehicle device 111A transmits a next Ethernet frame F2 to the on-vehicle device 111E via the switch device 101 with, as an upper limit, the data amount specified by the window size included in the TCP header field of the ACK frame ackF2 (step S42).

Next, the control unit 73 determines the state of the storage unit 72 at a predetermined timing after a predetermined time has elapsed from when the state of the storage unit 72 was determined last time (step S43).

Upon determining, based on the determined state of the storage unit 72, that the window size need not be reduced, the control unit 73 cancels the setting of the reduction amount W of the window size (step S44).

Next, the on-vehicle device 111A transmits an Ethernet frame F1 corresponding to the application 1 to the on-vehicle device 111E via the switch device 101 (step S45).

Upon receiving the Ethernet frame F1, the on-vehicle device 111E transmits an ACK frame ackF1 for the Ethernet frame F1 to the switch device 101 (step S46).

Upon receiving the ACK frame ackF1, the switch device 101 transmits the ACK frame ackF1 to the on-vehicle device 111A without rewriting the window size included in the ACK frame ackF1 (step S47).

Next, the on-vehicle device 111A transmits an Ethernet frame F2 corresponding to the application 2 to the on-vehicle device 111E via the switch device 101 (step S48).

Upon receiving the Ethernet frame F2, the on-vehicle device 111E transmits an ACK frame ackF2 for the Ethernet frame F2 to the switch device 101 (step S49).

Upon receiving the ACK frame ackF2, the switch device 101 transmits the ACK frame ackF2 to the on-vehicle device 111A without rewriting the window size included in the ACK frame ackF2 (step S50).

In more detail, in step S35, the L3 relay unit 71 in the switch device 101 receives the ACK frame ackF1 via the L2 switch processing unit 60, and stores the received ACK frame ackF1 in the storage unit 72. When the L3 relay unit 71 has received the ACK frame ackF1, the control unit 73 notifies the L3 relay unit 71 of the set reduction amount W1 of the window size.

The L3 relay unit 71 acquires the ACK frame ackF1 from the storage unit 72, rewrites the window size included in the ACK frame ackF1 according to the reduction amount W1, rewrites the VID, etc., included in the ACK frame ackF1, and outputs the ACK frame ackF1 to the L2 switch processing unit 60.

In step S40, the L3 relay unit 71 in the switch device 101 receives the ACK frame ackF2 via the L2 switch processing unit 60, and stores the received ACK frame ackF2 in the storage unit 72. When the L3 relay unit 71 has received the ACK frame ackF2, the control unit 73 notifies the L3 relay unit 71 of the set reduction amount W2 of the window size.

The L3 relay unit 71 acquires the ACK frame ackF2 from the storage unit 72, rewrites the window size included in the ACK frame ackF2 according to the reduction amount W2, rewrites the VID, etc., included in the ACK frame ackF2, and outputs the ACK frame ackF2 to the L2 switch processing unit 60.

Thus, the switch device 101 adjusts the data amount of an Ethernet frame to be transmitted next by the on-vehicle device 111A, according to the usage amount of the storage unit 72.

[Estimation from Transmission Rate]

In the switch device 101, the control unit 73 may determine the state of the storage unit 72, based on the transmission rate of communication data at the communication port 54.

In more detail, the control unit 73 periodically or non-periodically monitors at least one of the communication ports 54, and determines the state of the storage unit 72, based on the transmission rate of communication data at the communication port 54.

For example, the control unit 73 monitors the respective communication ports 54, and determines the state of the storage unit 72, based on the transmission rate (hereinafter, also referred to as "maximum transmission rate") of a communication port, the average transmission rate of which is maximum. Alternatively, the control unit 73 monitors the respective communication ports 54, and determines the state of the storage unit 72, based on the average value of the transmission rates of the communication ports.

FIG. 15 shows an example of a usage amount estimation table held by the control unit in the switch device according to the embodiment of the present disclosure.

With reference to FIG. 15, for example, the control unit 73 holds the usage amount estimation table indicating the correspondence between the maximum transmission rate and the usage amount of the storage unit 72 after elapse of a predetermined time. The control unit 73 estimates the usage amount of the storage unit 72 after elapse of the predetermined time, with reference to the usage amount estimation table.

Specifically, for example, when the maximum transmission rate is lower than 50 Mbps, the control unit 73 estimates that the usage amount of the storage unit 72 after elapse of the predetermined time is less than 500 kilobytes. When the maximum transmission rate is equal to or higher than 50 Mbps, the control unit 73 estimates that the usage amount of the storage unit 72 after elapse of the predetermined time is equal to or greater than 500 kilobytes and less than 1000 kilobytes. When the maximum transmission rate is equal to or higher than 75 Mbps, the control unit 73 estimates that the usage amount of the storage unit 72 after elapse of the predetermined time is equal to or greater than 1000 kilobytes and less than 1500 kilobytes. When the maximum transmission rate is equal to or higher than 100 Mbps, the control unit 73 estimates that the usage amount of the storage unit 72 after elapse of the predetermined time is equal to or greater than 1500 kilobytes and less than 2000 kilobytes.

The control unit 73 determines the state of the storage unit 72 based on the estimation result, and adjusts the throughput of communication data for each application.

In more detail, the control unit 73 determines the relay delay time T with reference to the delay time table shown in FIG. 9, based on the estimated usage amount of the storage unit 72. Alternatively, the control unit 73 determines the reduction amount W of the window size with reference to the window size table shown in FIG. 12, based on the estimated usage amount of the storage unit 72.

[Operation Flow]

Figure 16:
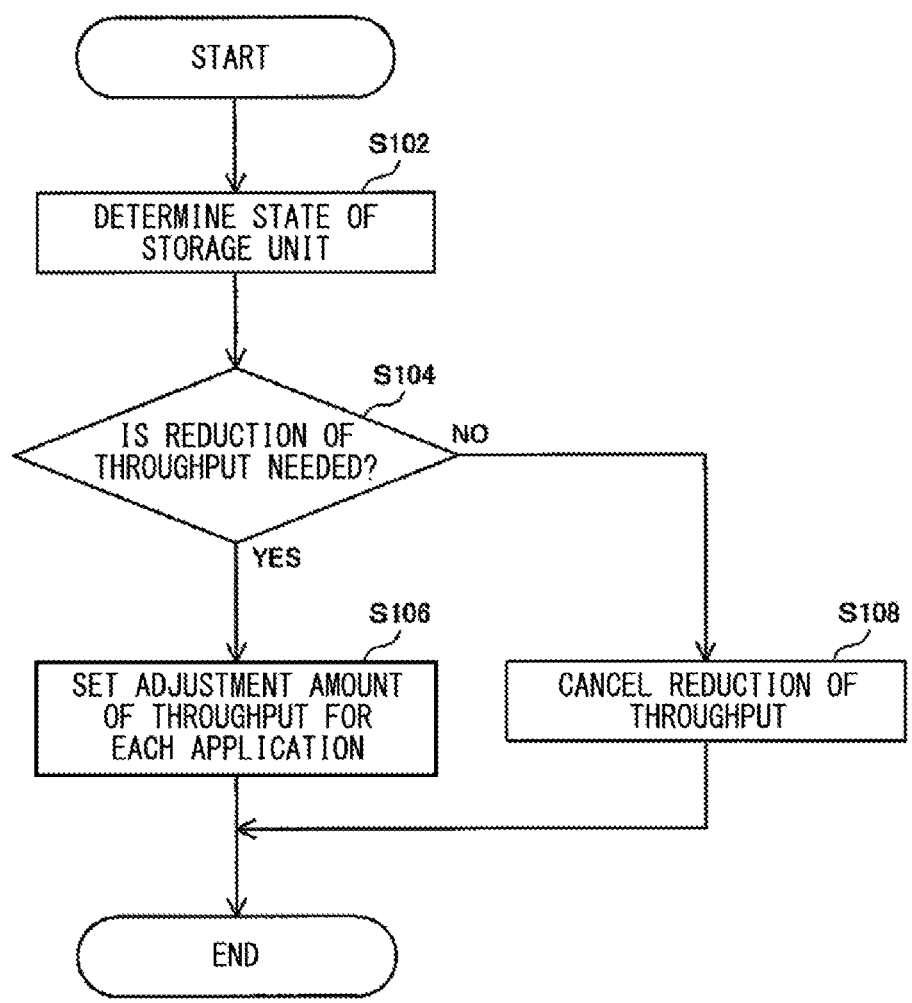
FIG. 16 is a flowchart showing an operation procedure when the switch device adjusts the throughput of communication data to be transmitted from an on-vehicle device, in the on-vehicle communication system according to the embodiment of the present disclosure.

FIG. 16 is a flowchart showing an operation procedure when the switch device adjusts the throughput of communication data to be transmitted from an on-vehicle device, in the on-vehicle communication system according to the embodiment of the present disclosure.

With reference to FIG. 16, the control unit 73 periodically or non-periodically determines the state of the storage unit 72 (step S102). Specifically, the control unit 73 periodically or non-periodically monitors the storage unit 72, and determines the state of the storage unit 72, based on the amount of data or the number of Ethernet frames stored in the storage unit 72. Alternatively, the control unit 73 periodically or non-periodically monitors the communication port 54, and determines the state of the storage unit 72, based on the transmission rate of communication data at the communication port 54.

Next, the control unit 73, based on the determined state of the storage unit 72, determines whether or not the throughput of communication data needs to be reduced (step S104). For example, the control unit 73 determines whether or not the throughput of communication data needs to be reduced, with reference to the delay time table shown in FIG. 9 or the window size table shown in FIG. 12.

Upon determining that the throughput of communication data needs to be reduced (YES in step S104), the control unit 73 sets the reduction amount of throughput for each application (step S106). For example, the control unit 73 sets the relay delay time T or the reduction amount W of the window size, for each application, according to the state of the storage unit 72.

Upon determining that the throughput of communication data need not be reduced (NO in step S104), the control unit 73 cancels reduction of the throughput (step S108). For example, the control unit 73 cancels the setting of the relay delay time T or the reduction amount W of the window size.

In the on-vehicle communication system according to the embodiment of the present disclosure, the control unit 73 may perform, according to the state of the storage unit 72, either one or both of delaying the transmission timing of the ACK frame, and changing the content of the transmission size information.

In the on-vehicle communication system according to the embodiment of the present disclosure, one on-vehicle device 111 has two applications, and the switch device 101 adjusts the throughput of communication data, for each application, when transmitting an Ethernet frame corresponding to the application to another on-vehicle device 111. However, the present disclosure is not limited thereto.

The control unit 73 may adjust the throughput of communication data, for each application, when transmitting an Ethernet frame corresponding to an application possessed by one on-vehicle device 111 and an Ethernet frame corresponding to an application possessed by another on-vehicle device 111, to still another on-vehicle device 111.

In the on-vehicle communication system according to the embodiment of the present disclosure, the L3 relay processing unit 70 includes the control unit 73, and the control unit 73 determines the state of the storage unit 72, and adjusts, for each application, the throughput of communication data to be transmitted from the on-vehicle device, based on the determination result. However, the present disclosure is not limited thereto.

The control unit 73, based on the determination result, may determine the relay delay time T with reference to the delay time table shown in FIG. 9, and may delay the transmission timing of an ACK frame by the L2 switch unit 61 in the L2 switch processing unit 60, thereby adjusting the throughput of communication data for each application. Alternatively, the control unit 73, based on the determination result, may determine the reduction amount W with reference to the window size table shown in FIG. 12, and may cause the L2 switch unit 61 to change the content of the transmission size information, thereby adjusting the throughput of communication data for each application.

The control unit 73 may determine the state of the storage unit 62 in the L2 switch processing unit 60, and may delay the transmission timing of an ACK frame by the L3 relay unit 71 or the L2 switch unit 61, based on the determination result, thereby adjusting the throughput of communication data for each application. Alternatively, the control unit 73 may determine the state of the storage unit 62 in the L2 switch processing unit 60, and may cause the L3 relay unit 71 or the L2 switch unit 61 to change the content of the transmission size information, based on the determination result, thereby adjusting the throughput of communication data for each application.

In the on-vehicle communication system according to the embodiment of the present disclosure, when transmitting Ethernet frames corresponding to two applications to another on-vehicle device 111, the switch device 101 adjusts the throughput of communication data for both the applications. However, the present disclosure is not limited thereto. Based on the state of the storage unit 72 determined by the control unit 73, the switch device 101 may adjust the throughput of communication data for only one of the applications without adjusting the throughput of communication data for the other application. Alternatively, when transmitting Ethernet frames corresponding to three or more applications to another on-vehicle device 111, the switch device 101 may adjust the throughput of communication data for at least one of the applications.

Incidentally, in the on-vehicle network disclosed in PATENT LITERATURE 1, the communication gateway that relays communication data transmitted/received between on-vehicle ECUs (Electronic Control Units) is provided.

For example, a large amount of communication data received from the on-vehicle ECUs may sometimes cause the communication gateway to be in the congestion state.

Specifically, for example, in the on-vehicle network, when the switch device 101 receives a large amount of communication data, e.g., Ethernet frames, from the on-vehicle device 111, overflow is likely to occur in the storage unit of the L3 relay processing unit 70, for example.

In order to eliminate such overflow of the storage unit, for example, a pause frame may be transmitted from the switch device 101 to the on-vehicle device 111 to reduce the frequency of transmission of Ethernet frames from the on-vehicle device.

However, if the on-vehicle device 111 has functions of a plurality of applications, it is not possible to relay Ethernet frames according to the priority levels of the applications such that an Ethernet frame corresponding to an application having a higher priority level is preferentially relayed.

In contrast to the above configuration, the switch device 101 according to the embodiment of the present disclosure is installed in the vehicle 1. The L3 relay unit 71 relays Ethernet frames between the plurality of on-vehicle devices 111 installed in the vehicle 1. The storage unit 72 holds Ethernet frames to be relayed. Then, the control unit 73 determines the state of the storage unit 72, and adjusts, for each application, the throughput of Ethernet frames to be transmitted from each on-vehicle device 111, based on the determination result.

With this configuration, the throughput of the Ethernet frames to be transmitted from the on-vehicle device 111 can be adjusted for each application, according to the state of the storage unit 72. For example, when the switch device 101 is in the congestion state, transmission of Ethernet frames can be selectively restricted according to the priority levels of the applications. Thus, the congestion state of the switch device 101 can be eased without a significant reduction in the throughput of Ethernet frames regarding an application having a higher priority level, whereby retention of Ethernet frames in the switch device 101 and transmission delay of the Ethernet frames can be adjusted in a well-balanced manner.

Therefore, in the switch device 101 according to the embodiment of the present disclosure, a more stable communication environment can be realized in the on-vehicle network.

In the switch device 101 according to the embodiment of the present disclosure, an on-vehicle device 111 transmits an Ethernet frame upon receiving an ACK frame from another on-vehicle device 111. The control unit 73 delays relay of the ACK frame by the L3 relay unit 71 to adjust the throughput.

With this configuration, since the control unit 73 delays relay of the ACK frame, the transmission timing of a next Ethernet frame from the on-vehicle device 111 can be delayed. Thus, it is possible to adjust the throughput for each application while using the existing process.

In the switch device 101 according to the embodiment of the present disclosure, an on-vehicle device 111 transmits an amount of Ethernet frames, per unit time, according to the window size in an ACK frame received from another on-vehicle device 111. The control unit 73 changes the content of the window size in the ACK frame received by the L3 relay unit 71, and causes the L3 relay unit 71 to relay the ACK frame, thereby adjusting the throughput.

With this configuration, since the control unit 73 changes the content of the window size in the ACK frame and causes the L3 relay unit 71 to relay the ACK frame, the data amount of an Ethernet frame to be transmitted next from the on-vehicle device 111 can be adjusted. Thus, it is possible to adjust the throughput for each application while using the existing process.

The switch device 101 according to the embodiment of the present disclosure is provided with a plurality of communication ports 54. The L3 relay unit 71 transmits/receives an Ethernet frame via each communication port 54. Then, the control unit 73 determines the state of the storage unit 72, based on the transmission rate of the Ethernet frame at the communication port 54.

With this configuration, the state of the storage unit 72 can be estimated in advance based on the transmission rate at the communication port 54, and the state of the storage unit 72 can be determined based on the estimation result. Therefore, for example, before the capacity of the storage unit 72 actually runs short, the throughput of Ethernet frames to be transmitted from the on-vehicle device 111 can be adjusted for each application.

In the communication control method according to the embodiment of the present disclosure, firstly, the switch device 101 relays an Ethernet frame between a plurality of on-vehicle devices 111 installed in the vehicle 1. Then, the switch device 101 determines the state of the storage unit 72, and adjusts, for each application, the throughput of Ethernet frames to be transmitted from an on-vehicle device 111, based on the determination result.

In this method, the throughput of Ethernet frames to be transmitted from the on-vehicle device 111 can be adjusted for each application, according to the state of the storage unit 72. For example, when the switch device 101 is in the congestion state, transmission of Ethernet frames can be selectively restricted according to the priority levels of the applications. Thus, the congestion state of the switch device 101 can be eased without a significant reduction in the throughput of Ethernet frames regarding an application having a higher priority level, whereby retention of Ethernet frames in the switch device 101 and transmission delay of the Ethernet frames can be adjusted in a well-balanced manner.

Therefore, in the communication control method according to the embodiment of the present disclosure, a more stable communication environment can be realized in the on-vehicle network.

[Modification 1 of Switch Device 101]

Referring back to FIG. 1, if an on-vehicle device 111 cannot normally receive an Ethernet frame, the on-vehicle device 111 transmits the same ACK frame three consecutive times to a transmission-source on-vehicle device 111 in order to request retransmission of the Ethernet frame.

In more detail, if the on-vehicle device 111 cannot normally receive an Ethernet frame, the on-vehicle device 111 consecutively transmits three ACK frames having the same Ethernet header field, the same IP header field, and the same TCP header field to the transmission-source on-vehicle device 111.

Upon receiving the same ACK frame three consecutive times within a predetermined period, the transmission-source on-vehicle device 111 retransmits the Ethernet frame transmitted last time.

With this configuration, retransmission of the Ethernet frame by the transmission-source on-vehicle device 111 is preferably performed without a delay, regardless of the state of the storage unit 72.

Therefore, in the switch device 101 according to modification 1, for example, when the L3 relay unit 71 has received an ACK frame regarding a certain application from an on-vehicle device 111, the control unit 73 compares the ACK frame received this time with the ACK frame received last time with respect to the application of the on-vehicle device, and determines, based on the comparison result, whether or not to delay the relay process for the ACK frame received this time.

In more detail, for example, when the L3 relay unit 71 has received an ACK frame regarding a certain application from an on-vehicle device 111, and then if the aforementioned fields in the ACK frame received last time with respect to the application from the on-vehicle device are the same as those in the ACK frame received this time, the control unit 73 causes the L3 relay unit 71 to relay, without a delay, the ACK frame received this time, regardless of the determination result of the state of the storage unit 72.

Figure 17:
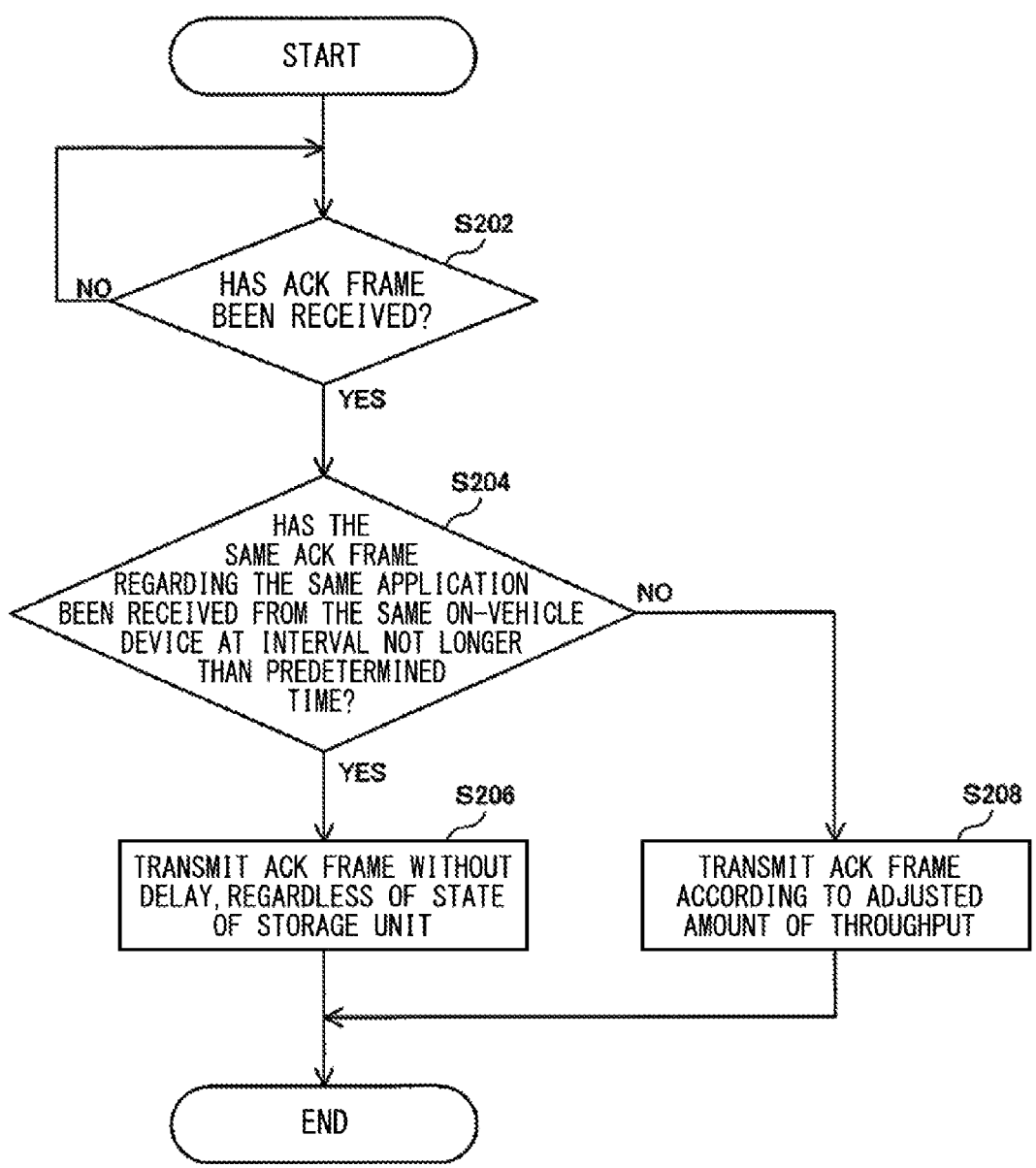
FIG. 17 is a flowchart showing an operation procedure when the switch device adjusts the throughput of communication data to be transmitted from an on-vehicle device, in the on-vehicle communication system according to the embodiment of the present disclosure.

FIG. 17 is a flowchart showing an operation procedure when the switch device adjusts the throughput of communication data to be transmitted from an on-vehicle device, in the on-vehicle communication system according to the embodiment of the present disclosure.

With reference to FIG. 17, the control unit 73 monitors the L3 relay unit 71, and waits until the L3 relay unit 71 receives an ACK frame (NO in step S202).

When the L3 relay unit 71 has received an ACK frame (YES in step S202), the control unit 73 checks whether or not a predetermined condition related to the ACK frame is satisfied (step S204). Specifically, the predetermined condition is that the L3 relay unit 71 has received, three consecutive times at an interval not longer than a predetermined time, an ACK frame of which the corresponding on-vehicle device 111 and application are the same as those of the ACK frame received this time, and of which the Ethernet header field, IP header field, and TCP header field are the same as those of the ACK frame received this time.

When the predetermined condition related to the ACK frame is satisfied (YES in step S204), the control unit 73 causes the L3 relay unit 71 to transmit, without a delay, the ACK frame received this time, regardless of the state of the storage unit 72 (step S206).

When the predetermined condition related to the ACK frame is not satisfied (NO in step S204), the control unit 73 causes the L3 relay unit 71 to transmit the ACK frame received this time, according to the adjusted amount of throughput (step S208).

As described above, in the switch device 101 according to the modification of the embodiment of the present disclosure, the control unit 73 compares an ACK frame received this time from an on-vehicle device 111 with an ACK frame received last time from the same on-vehicle device 111, and determines whether or not to delay relay of the ACK frame received this time, based on the comparison result.

If an on-vehicle device 111 cannot normally receive an Ethernet frame transmitted from another on-vehicle device 111, this on-vehicle device 111 may transmit, a predetermined consecutive number of times, an ACK frame to the other on-vehicle device 111 in order to request retransmission of the Ethernet frame from the other on-vehicle device. In this case, the configuration of the switch device 101 according to the modification can prevent retransmission of the Ethernet frame from being delayed.

The above embodiment is illustrative in all aspects and should not be recognized as being restrictive. The scope of the present invention is defined by the scope of the claims rather than the above description, and is intended to include meaning equivalent to the scope of the claims and all modifications within the scope.

The above description includes features in the additional notes below.

[Note 1]

A switch device installed in a vehicle, comprising:
a switch unit configured to relay communication data between a plurality of function units installed in the vehicle;
a storage unit configured to hold the communication data to be relayed; and
a control unit configured to determine a state of the storage unit, and adjust, for each of applications, a throughput of the communication data to be transmitted from the function units, based on a result of the determination, wherein
the control unit acquires a relay delay time with reference to a delay time table indicating the correspondence, for each application, between a usage amount of the storage unit and a relay delay time, and delays, by the acquired relay delay time, relay of an ACK frame by the switch unit, thereby adjusting the throughput.

[Note 2]

A switch device installed in a vehicle, comprising:
a switch unit configured to relay communication data between a plurality of function units installed in the vehicle;
a storage unit configured to hold the communication data to be relayed; and
a control unit configured to determine a state of the storage unit, and adjust, for each of applications, a throughput of the communication data to be transmitted from the function units, based on a result of the determination, wherein
the control unit acquires a reduction amount with reference to a window size table indicating correspondence, for each application, between a usage amount of the storage unit and a reduction amount of a window size, and changes a window size of an ACK frame received by the switch unit, according to the acquired reduction amount, thereby adjusting the throughput.

REFERENCE SIGNS LIST 1 vehicle
10 Ethernet cable
54 communication port
60 L2 switch processing unit
61 L2 switch unit
62 storage unit
70 L3 relay processing unit
71 L3 relay unit
72 storage unit
73 control unit
74 timer
101 switch device
111 on-vehicle device
301 on-vehicle communication system

The invention claimed is:

1. A switch device installed in a vehicle, comprising:
a switch unit configured to relay communication data between a plurality of function units installed in the vehicle;
a storage unit configured to hold the communication data to be relayed; and
a control unit configured to determine a state of the storage unit, and adjust, for each of applications, a throughput of the communication data to be transmitted from the function units, based on a result of the determination, wherein
each function unit transmits the communication data upon receiving an ACK from another function unit,
the control unit adjusts the throughput by causing the switch unit to delay relay of the ACK, and
the control unit compares the ACK that is received this time from a function unit with the ACK that has been received last time from the same function unit, and determines whether or not to delay relay of the ACK that is received this time, based on a result of the comparison.

2. The switch device according to claim 1, wherein
each function unit transmits the communication data, per unit time, of an amount corresponding to transmission size information received from another function unit, and
the control unit changes a content of the transmission size information received by the switch unit and causes the switch unit to relay the transmission size information, thereby adjusting the throughput.

3. The switch device according to claim 1, further comprising a plurality of communication ports, wherein
the switch unit transmits and receives the communication data via the communication ports, and
the control unit determines the state, based on a transmission rate of the communication data at the communication ports.

4. A communication control method for a switch device that is installed in a vehicle and includes a storage unit for holding communication data to be relayed, the method comprising:
relaying communication data between a plurality of function units installed in the vehicle;
determining a state of the storage unit, and adjusting, for each of applications, a throughput of the communication data to be transmitted from the function units, based on a result of the determination;
each function unit transmitting the communication data upon receiving an ACK from another function unit;
adjusting the throughput by causing the switch unit to delay relay of the ACK; and
comparing the ACK that is received this time from a function unit with the ACK that has been received last time from the same function unit, and determining whether or not to delay relay of the ACK that is received this time, based on a result of the comparison.

5. A non-transitory computer readable storage medium storing a communication control program for a switch device that is installed in a vehicle and includes a storage unit for holding communication data to be relayed, the program causing a computer to function as:
a switch unit configured to relay communication data between a plurality of function units installed in the vehicle; and
a control unit configured to determine a state of the storage unit, and adjust, for each of applications, a throughput of the communication data to be transmitted from the function units, based on a result of the determination, wherein
each function unit transmits the communication data upon receiving an ACK from another function unit,
the control unit adjusts the throughput by causing the switch unit to delay relay of the ACK, and
the control unit compares the ACK that is received this time from a function unit with the ACK that has been received last time from the same function unit, and determines whether or not to delay relay of the ACK that is received this time, based on a result of the comparison.

\* \* \* \* \*